United States Patent
Murabata

(10) Patent No.: US 8,255,077 B2
(45) Date of Patent: Aug. 28, 2012

(54) APPARATUS, METHOD AND PROGRAM FOR CREATING TOOL REFERENCE PLANE

(75) Inventor: Shinichi Murabata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 392 days.

(21) Appl. No.: 12/671,032

(22) PCT Filed: Jul. 30, 2008

(86) PCT No.: PCT/JP2008/063697
§ 371 (c)(1),
(2), (4) Date: Jan. 28, 2010

(87) PCT Pub. No.: WO2009/017169
PCT Pub. Date: Feb. 5, 2009

(65) Prior Publication Data
US 2010/0217416 A1    Aug. 26, 2010

(30) Foreign Application Priority Data
Aug. 1, 2007    (JP) ................................. 2007-200539

(51) Int. Cl.
*G06F 19/00*    (2011.01)
(52) U.S. Cl. ....................................................... 700/182
(58) Field of Classification Search .................... 700/29, 700/169, 173, 176, 182, 186, 194
See application file for complete search history.

(56) References Cited

U.S. PATENT DOCUMENTS
4,755,949 A * 7/1988 Shiratori et al. ............... 700/192

FOREIGN PATENT DOCUMENTS
| JP | 6-254744 | 9/1994 |
| JP | 7-100733 | 4/1995 |
| JP | 10-20919 | 1/1998 |
| JP | 2005-202792 | 7/2005 |
| JP | 2005-301545 | 10/2005 |

OTHER PUBLICATIONS

Notification of Reasons for Rejection for JP Application No. 2007-200539 dated May 24, 2011.

* cited by examiner

*Primary Examiner* — John Cottingham
*Assistant Examiner* — Chad Rapp
(74) *Attorney, Agent, or Firm* — Finnegan, Henderson, Farabow, Garrett & Dunner, LLP

(57) ABSTRACT

An apparatus for calculating a tool reference plane utilizes a machining plane model and an inversed tool model to create a collection of sphere regions having three dimensional grid points as their center, and identifies a nearest point on each of the model planes from the respective center point of the sphere regions. The positions within the tool reference plane can be accurately identified to the degree of the grid interval of the three dimensional grid points using the machining plane model and the inversed tool model consisting of the collection of sphere regions. By using the nearest point on each of the model planes, the position of the tool reference plane is identified using the accuracy created by the model planes. According to this apparatus, a tool reference plane can be created accurately irrespective of the shape of the machining plane model.

7 Claims, 9 Drawing Sheets

US 8,255,077 B2

APPARATUS, METHOD AND PROGRAM FOR CREATING TOOL REFERENCE PLANE

CROSS-REFERENCE TO RELATED APPLICATION

This application is a national phase application of International Application No. PCT/JP2008/063697, filed Jul. 30, 2008, and claims priority to Japanese Patent Application No. 2007-200539, filed on Aug. 1, 2007, the contents of both of which are hereby incorporated by reference into the present application.

FIELD OF THE INVENTION

The present invention relates to a technique for creating a plane model utilized in an NC machining technique (a numerical control machining technique). In particular, the present invention relates to a technique for creating a tool reference plane which is offset from a machining plane model by an amount equal to a tool shape.

BACKGROUND OF THE INVENTION

The NC machining technique is used in forming a machining plane in a material by relatively moving a tool and/or the material along a predetermined movement path. The 'machining plane' herein refers to an actual surface plane to which the material is to be formed as a result of the processing by the tool. In the NC machining technique, the shape of the machining plane is represented by a machining plane model calculated using a three dimensional CAD (Computer Aided Design) apparatus. In order to form a desired machining plane in the material (,) in the course of actually performing tool processing using the NC machine tool, the movement path of the tool should be predeterminedly calculated based on the machining plane model that represents the desired machining plane.

In the NC machining technique, a tool reference point is determined in the tool in order to represent the position of the tool using coordinates. The movement path of the tool can be determined based on the movement path of the tool reference point. The 'tool reference point' herein refers to a point that can voluntarily be determined within a tool shape. For example, in a case where a tool reference point and a knife edge of a tool are respectively determined, when the knife edge of the tool is moved while the edge being in contact with the machining plane of the work material, the movement path of the tool equals the path along which the tool reference point moves. As a result, the movement path of the tool is positioned on a plane that is offset from the machining plane by an amount equal to the tool shape. In order to determine the movement path of the tool, it is necessary to calculate a tool reference plane model that is offset from the machining plane by an amount equal to the tool shape based on the machining plane model that represents the machining plane. The 'tool reference plane model' is a plane created from a sequence of a movement of the tool reference point.

Japanese patent application publication No. 06-25744 teaches a technique for calculating a tool reference plane model utilizing an inverse offset method. The inverse offset method utilizes an inversed tool model system in which a machining plane model and the tool shape are inversed with respect to the position of the machining plane model and the tool shape in the actual machine processing. The method calculates an enveloping plane model of the inversed tool models having its tool reference point positioned over the machining plane model. The method is able to calculate a tool reference plane model that is offset from the machining plane model by an amount equal to the tool shape.

DISCLOSURE OF THE INVENTION

Problem to be Solved by the Invention

In the conventional inverse offset method, envelop evaluation of the inversed tool models positioned over the machining plane model is performed based on Z axis coordinates at positions within a lattice plane determined along an XY plane. As a result, in cases where a vertical wall (a surface extending in the Z axis direction) is included in the machining plane model, the envelop evaluation cannot be performed for this vertical part. In the conventional inverse offset method, the tool reference plane model may not be so accurate depending on the shape of the machining plane model.

The present invention has taken the above problem into consideration, and teaches a technique for accurately calculating a tool reference plane model regardless of the shape of the machining plane model.

Means to Solve the Problem

The present invention is realized in an apparatus for calculating a tool reference plane that is offset from a machining plane model in accordance with a tool shape model. This apparatus comprises a means for storing machining plane model data that describes the machining plane model that is arranged in a first XYZ coordinate system, and a means for storing inversed tool model data that describes the tool shape model that is inversely arranged in a second XYZ coordinate system. The tool shape model has a tool reference point that is located at the origin of the second XYZ coordinate system. This apparatus stores the machining plane model data and inversed tool model data that have been taught from the exterior, and calculates the tool reference plane model utilizing the sets of aforesaid data.

This apparatus further comprises: a means for determining a plurality of sphere regions in the first XYZ coordinate system and the second XYZ coordinate system respectively, wherein center points of the sphere regions are grid points that are arranged three dimensionally with a predetermined grid interval and a radius of each sphere region is within $3^{1/2}/2$ times the predetermined grid interval; a means for identifying a plurality of machining plane containing sphere regions in which the machining plane model is contained from among the plurality of sphere regions in the first XYZ coordinate system, wherein the means further identifies, for each machining plane containing sphere region, a nearest point on the machining plane model from the center point of the machining plane containing sphere region; a means for storing machining plane containing sphere region data describing each of the identified machining plane containing sphere regions in association with the nearest point on the machining the plane model identified based on the center point of the machining plane containing sphere region; a means for identifying a plurality of inversed tool model containing sphere regions in which the inversed tool model is contained from among the plurality of sphere regions in the second XYZ coordinate system, wherein the means further identifies, for each inversed tool model containing sphere region, a nearest point on the inversed tool model from the center point of the inversed tool model containing sphere region; and a means for storing inversed tool model containing sphere region data, each of which describes the identified inversed tool model containing sphere regions in association with the nearest point on the inversed tool model identified based on the center point of the inversed tool model containing sphere region.

Using these means, a set of data that describes the machining plane model taught from the exterior as a collection of sphere regions and a set of data that describes the inversed model of the tool shape taught from the exterior as a collection of sphere regions are created. Since the sets of data are respectively include associations of the grid points of the sphere regions with the corresponding nearest points thereto, detailed shapes of each model are described.

The apparatus further comprises a means for identifying a plurality of tool reference plane containing sphere regions from among the plurality of sphere regions in the first XYZ coordinate system and one or more contact point containing sphere regions from among the plurality of machining plane containing sphere region based on the machining plane containing sphere region data and the inversed tool model containing sphere region data. The means arranges the inversed tool model containing sphere regions inversely in the first XYZ coordinate system such that one or more inversed tool model containing sphere regions make contact with one or more machining plane containing sphere regions, and identifies sphere regions whose center points coincides with the tool reference point of the inversed tool model as the tool reference plane containing sphere regions. Further, the means identifies one or more contact point containing sphere regions for each of the tool reference plane containing sphere regions. That is, the one or more machining plane containing sphere regions making contact with the one or more inversed tool model containing sphere regions are identified as the contact point containing sphere regions.

Using this means, the tool reference plane model can be accurately calculated to a detailed degree of the grid interval of the three dimensional grid points. By accurately calculating with the degree of detail to the grid interval of the three dimensional grid points, the tool reference plane model can reduce processing burden of a calculating process, which will be described later, that is required to calculate offset points.

The apparatus further comprises: a means for identifying a plurality of offset points, the means performing, for each of the identified one or more contact point containing sphere regions, an offset candidate point identifying process for calculating one or more offset candidate points, and further identifying one of the identified offset candidate points, which is contained within the tool reference plane containing sphere region and is closest to the center grid point of the tool reference plane containing sphere region, as an offset point; and a means for storing tool reference plane model data that describes coordinate positions of the plurality of identified offset points. The offset candidate point identifying process comprises: retrieving, from the machining plane containing sphere region data, the nearest point on the machining plane model from the center point of the contact point containing sphere region; calculating a relative coordinate position from the center point of the contact point containing sphere region to the center grid point of the tool reference plane containing sphere region; identifying, from the inversed tool model containing sphere region stored in the inversed tool model containing sphere region data, one inversed tool model containing sphere region that has a relative position from the tool reference point to its center point that is equal to the calculated relative coordinate position; retrieving, from the inversed tool model containing sphere region data, the nearest point on the inversed tool model from the identified inversed tool model containing sphere region; and calculating the offset candidate point by shifting the retrieved nearest point on the machining plane model by an amount equal to the coordinate position of the retrieved nearest point on the inversed tool model.

Using this apparatus, it is possible to accurately identify the offset points; which are points on the tool reference plane model. Since the comparison of the distance (i.e. of the aforesaid positions) from the center point of the tool reference plane containing sphere region to the offset candidate points is performed three dimensionally, the offset points are identified uniquely for all directions. The offset points are identified for each of the identified tool reference plane containing sphere regions, and the tool reference plane model can be determined using the identified offset points. With this apparatus, it is possible to accurately calculate the tool reference plane model even if the machining plane model has a shape that includes, for example, a vertical wall.

It is preferred that in the aforementioned apparatus, the means for identifying the plurality of machining plane containing sphere regions comprises a means for identifying a plurality of machining plane vertex containing sphere regions, a means for identifying machining plane edge containing sphere regions, and a means for identifying machining plane surface containing sphere regions. All of the machining plane containing sphere regions contained within the machining plane model can thereby be identified efficiently.

The means for identifying machining plane vertex containing sphere regions may extract, from the machining plane model data, a plurality of vertices composing the machining plane model; identify, for each extracted vertex, a sphere region in which the vertex is contained; and store the identified sphere region in association with the extracted vertex in the means for storing the machining plane containing sphere region data.

The means for identifying the plurality of machining plane edge containing sphere regions may extract, based on the machining plane model data, a plurality of edges composing the machining plane model; and identifies, for each extracted edge, a sphere region in which a predetermined point within the edge is contained as a source machining plane containing sphere region. Next, twenty-six sphere regions that circumscribe (i.e., are adjacent to) the identified source machining plane containing sphere regions may be determined to be sphere regions that are search subjects, upon which a process of identification search as mentioned below is to be performed. For each sphere region that has been determined to be the search subject, a containing sphere region identifying process may be performed; which is a process that contains the followings. First, a nearest point on the edge from the center point of the sphere region may be calculated. Next, in the case where the calculated nearest point on the edge is contained in the sphere region, this sphere region may be identified as a machining plane containing sphere region. Next, in a case where the identified machining plane containing sphere region has not been stored in the means for storing machining plane containing sphere region data, the identified machining plane containing sphere region may be stored in association with the nearest point in the storing means. Further, the twenty six sphere regions that circumscribe the identified machining plane containing sphere region may simultaneously be further determined to be sphere regions that are search subjects.

The means for identifying the plurality of machining plane surface containing sphere regions may: (1) extract, based on the machining plane model data, a surface composing the machining plane model, and vertices and edges composing a boundary of the surface, and (2) retrieve a plurality of machining plane containing sphere regions that include at least a part of one of the extracted vertices and/or edges from the machining plane containing sphere region data. Next, boundary sphere regions for the extracted surfaces may (3) be determined in the retrieved machining plane containing sphere regions. Next, for each of the extracted surfaces, a sphere region that contains a predetermined point within the extracted surface and is adjacent to the plurality of boundary sphere regions may (4) be identified as a source machining plane containing sphere region. Next, the twenty six sphere regions that are adjacent to the identified source machining plane containing sphere regions may (5) be determined to be sphere regions that are search subjects. For each of the sphere regions that was determined to be a search subject, a containing sphere region identifying process may (6) be performed; which contains the following processes. In the containing sphere region identifying process, a nearest point on the surface from the center point of the sphere region may be calculated; a sphere region in which the calculated nearest point on the surface is contained and is adjacent to the plurality of boundary sphere regions may be identified as a machining plane containing sphere region; the identified machining plane containing sphere region may be stored in association with the nearest point in the means for storing machining plane containing sphere region data in a case where the identified machining plane containing sphere region has not been stored in the storing means; and twenty six sphere regions that circumscribe the identified machining plane containing sphere region may further be determined to be additional search subjects. The aforementioned containing sphere region identifying process may be performed repeatedly until there are no remaining sphere regions that have not been determined to be search subjects. According to this means, the containing sphere region identifying process may be iterated after another set of boundary sphere regions are newly determined from the plurality of machining plane containing sphere regions that has been identified in the containing sphere region identifying process, and new sphere regions as the source machining plane containing sphere regions and the search subjects are identified.

In the aforementioned apparatus, it is preferred that the means for identifying the plurality of inversed tool model containing sphere regions comprises a means for identifying a plurality of inversed tool model vertex containing sphere regions, a means for identifying inversed tool model edge containing sphere regions, and a means for identifying inversed tool model surface containing sphere regions. All of the inversed tool model containing sphere regions contained within the inversed tool model can thereby be identified efficiently.

The means for identifying inversed tool model vertex containing sphere regions may: extract, based on the inversed tool model data, a plurality of vertices composing the inversed tool model; identify, for each extracted vertex, a sphere region in which the vertex is contained; and store the identified sphere region in association with the extracted vertex in the means for storing inversed tool model containing sphere region data.

The means for identifying inversed tool model edge containing sphere regions may: extract, based on the inversed tool model data, a plurality of edges composing the inversed tool model; and identify, for each extracted edge, a sphere region in which a predetermined point within the edge is contained as a source inversed tool model containing sphere region. Next, twenty-six sphere regions that circumscribe the identified source inversed tool model containing sphere regions may be determined to be sphere regions that are search subjects. For each sphere region that has been determined to be the search subject, a containing sphere region identifying process may be performed; which is a process that contains the followings. In the containing sphere region identifying process, a nearest point on the edge from the center point of the sphere region may be calculated; in the case where the calculated nearest point on the edge is contained in the sphere region, this sphere region may be identified as an inversed tool model containing sphere region; in a case where the identified inversed tool model containing sphere region has not been stored in the means for storing inversed tool model containing sphere region data, the identified inversed tool model containing sphere region may be stored in association with the nearest point in the storing means; and the twenty six sphere regions that circumscribe the identified inversed tool model containing sphere region may be determined to be search subjects.

The means for identifying inversed tool model surface containing sphere regions may (7) extract, based on the inversed tool model data, a surface composing the inversed tool model and vertices and edges composing a boundary of each surface, and (8) retrieve a plurality of inversed tool model containing sphere regions that includes the extracted at least a part of one of the vertices and/or edges from the inversed tool model containing sphere region data. Next, boundary sphere regions for the extracted surfaces may (9) be determined in the retrieved inversed tool model containing sphere regions. Next, for each of the extracted surfaces, a sphere region that contains a predetermined point within the extracted surface and is adjacent to the plurality of boundary sphere regions may (10) be identified as a source inversed tool model containing sphere region. Next, each of the twenty-six sphere regions that circumscribe the identified source inversed tool model containing sphere regions may (11) be determined to be a search subject. For each of the sphere regions that was determined to be the search subject, a containing sphere region identifying process may (12) be performed; which is a process that contains the followings. In the containing sphere region identifying process, a nearest point on the surface from the center point of the sphere region may be calculated; a sphere region in which the calculated nearest point on the surface is contained and is adjacent to the plurality of boundary sphere regions may be identified as an inversed tool model containing sphere region; the identified inversed tool model containing sphere region may be stored in association with the nearest point in the means for storing inversed tool model containing sphere region data in a case where the identified inversed tool model containing sphere region has not been stored in the storing means; and twenty six sphere regions that circumscribe the identified inversed tool model containing sphere region may further be determined to be sphere regions that are search subjects. The aforementioned containing sphere region identifying process may be performed repeatedly until there are no remaining sphere regions that have not been determined to be search subjects. According to this means, the containing sphere region identifying process may be iterated after another set of boundary sphere regions are newly determined from the plurality of machining plane containing sphere regions that has been identified in the containing sphere region identifying process, and new sphere regions as the source machining plane containing sphere regions and the search subjects are identified.

In the aforementioned apparatus, upon identifying the plurality of tool reference plane containing sphere regions, it is preferred that the means for identifying the plurality of tool reference plane containing sphere regions determines a plurality of sphere regions that are aligned along a predetermined search direction as a set of process subject sphere regions; identifies at least one tool reference plane containing sphere region from among the set of sphere regions that were determined to be the process subject sphere regions; determines twenty-six sphere regions that circumscribe the identified tool reference plane containing sphere region to be another set of process subject sphere regions; and further identifies at least one of the tool reference plane containing sphere region from among the another set of process subject sphere regions, and determines another twenty-six sphere regions that circumscribe the identified tool reference plane containing sphere region to be yet another set of process subject sphere regions.

Alternatively, upon identifying the plurality of tool reference plane containing sphere regions, it is preferred that the means for identifying the plurality of tool reference plane containing sphere regions extracts a predetermined machining plane containing sphere region from the machining plane containing sphere region data and a nearest point on the machining plane model from the center position of the predetermined machining plane containing sphere region; calculates a normal vector direction of the machining plane model on the nearest point based on the center point of the extracted machining plane containing sphere region and the nearest point thereto; determines a plurality of sphere regions that align along the direction of the calculated normal vector as a set of process subject sphere regions; identifies at least one tool reference plane containing sphere region from among the set of process subject sphere regions; determines twenty-six sphere regions that circumscribe the identified tool reference plane containing sphere region to be another set of process subject sphere regions; identifies at least one tool reference plane containing sphere region from among the another set of process subject sphere regions; and further determines another twenty-six sphere regions that circumscribe the identified tool reference plane containing sphere region to be yet another set of process subject sphere regions.

According to either of the above configurations, all of the tool reference plane containing sphere regions contained within the tool reference plane model can be identified efficiently.

The present invention is also realized in a method for calculating a tool reference plane that is offset from a machining plane model in accordance with a tool shape model. This method comprises the following steps performed by a processor: storing machining plane model data that describes the machining plane model that is arranged in a first XYZ coordinate system; storing inversed tool model data that describes the tool shape model that is inversely arranged in a second XYZ coordinate system, wherein the tool shape model has a tool reference point that is located at the origin of the second XYZ coordinate system; and determining a plurality of sphere regions in the first XYZ coordinate system and the second XYZ coordinate system, wherein center points of the sphere regions are grid points that are arranged three dimensionally with a predetermined grid interval and a radius of each sphere region is equal to $3^{1/2}/2$ times the predetermined grid interval.

This method further comprises the following steps performed by the processor: identifying a plurality of machining plane containing sphere regions, in which the machining plane model is contained, from among the plurality of sphere regions in the first XYZ coordinate system; further identifying, for each machining plane containing sphere region, a nearest point on the machining plane model from the center point of the identified machining plane containing sphere region; storing machining plane containing sphere region data describing each of the identified machining plane containing sphere regions in association with the nearest point on the machining plane model identified based on the center point of the machining plane containing sphere region; identifying a plurality of inversed tool model containing sphere regions, in which the inversed tool model is contained, from among the plurality of sphere regions in the second XYZ coordinate system; further identifying, for each inversed tool model containing sphere region, a nearest point on the inversed tool model from the center point of the identified inversed tool model containing sphere region; and storing inversed tool model containing sphere region data, each of which describes the identified inversed tool model containing sphere regions in association with the nearest point on the inversed tool model identified based on the center point of the inversed tool model containing sphere region.

This method further comprises the following steps performed by the processor: identifying, based on the machining plane containing sphere region data and the inversed tool model containing sphere region data, a plurality of tool reference plane containing sphere regions from among the plurality of sphere regions in the first XYZ coordinate system, wherein sphere regions in the first XYZ coordinate system whose center point coincide with the tool reference point of the inversed tool model and the inversed tool model are identified as the tool reference plane containing sphere regions when the inversed tool model containing sphere regions are arranged inversely in the first XYZ coordinate system such that one or more inversed tool model containing sphere regions make contact with one or more machining plane containing sphere regions; further identifying one or more contact point containing sphere regions, wherein the one or more machining plane containing sphere regions making contact with the one or more inversed tool model containing sphere regions are identified as the contact point containing sphere regions; identifying a plurality of offset points, which is a step in which an offset candidate point identifying process is performed for each of the identified contact point containing sphere regions, to calculate one or more offset candidate points and to identify one of the identified offset candidate points that is contained within the tool reference plane containing sphere region and is closest to the center point of the tool reference plane containing sphere region is identified as an offset point; and storing tool reference plane model data that describes coordinate positions of the plurality of identified offset points. The offset candidate point identifying process may comprise: retrieving, from the machining plane containing sphere region data, the nearest point on the machining plane model from the center point of the contact point containing sphere region; calculating a relative coordinate position from the center point of the contact point containing sphere region to the center point of the tool reference plane containing sphere region; identifying, from the inversed tool model containing sphere region data, one inversed tool model containing sphere region that has a relative position from the tool reference point to its center point equaling the calculated relative coordinate position; retrieving, from the inversed tool model containing sphere region data, the nearest point on the inversed tool model from the identified inversed tool model containing sphere regions; and calculating the offset candidate point by shifting the retrieved nearest point on the machining plane model by an amount equaling the coordinate position of the retrieved nearest point on the inversed tool model.

According to this method, it is possible to accurately identify the offset points; which are points on the tool reference plane model. Since the comparison of the distance (i.e. of the aforesaid positions) from the center point of the tool reference plane containing sphere region to the offset candidate points is performed three dimensionally, the offset points are identified uniquely for all directions. The offset points are identified for each of the tool reference plane containing sphere regions, and the tool reference plane model can be determined using the identified offset points. Using this method, it is possible to accurately calculate the tool reference plane model even if the machining plane model is a shape that includes, for example, a vertical wall.

The present invention can further be realized in a program for creating a tool reference plane that is offset from a machining plane model by an amount equal to a tool shape. This program is a program for working the processor to perform the processes described above. By using this program, the apparatus and method of the present invention can be performed using e.g., a general purposed processor.

Effect of the Invention

By calculating the tool reference plane model using the present teachings, it is possible to improve the accuracy of machine processing of the machining plane using the NC machine tool.

PREFERRED EMBODIMENT OF THE INVENTION

Figure 1:
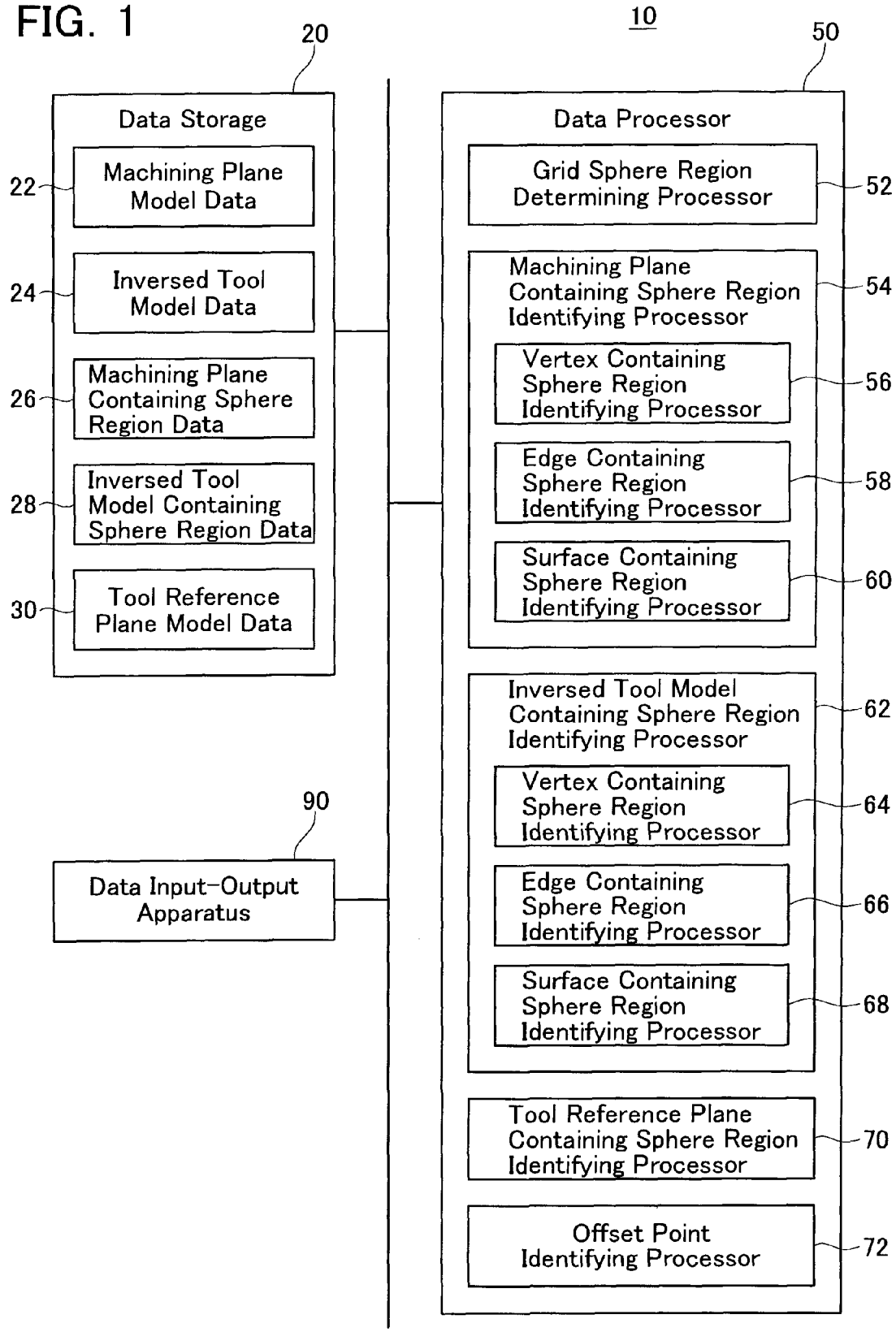
FIG. 1 shows a block diagram of the schematic configuration of an apparatus for creating tool reference plane model data.

FIG. 1 shows the functional configuration of an apparatus for creating a tool reference plane model 10 (below, this apparatus is abbreviated to "creating apparatus 10") in which the present invention is implemented. The creating apparatus 10 is an apparatus for calculating, for example, a tool reference plane model that is offset by an amount equal to a tool shape from a machining plane model that represents the shape of a machining plane. The tool reference plane model created by the creating apparatus 10 is used in, for example, creating a movement path of a tool for forming a machining plane in a material by using a numerical control (NC) machines.

As shown in FIG. 1, the creating apparatus 10 functionally comprises a data storage 20, a data processor 50, and a data input/output portion 90. The creating apparatus 10 is a configuration using a computer apparatus. The data storage 20, the data processor 50, and the data input/output portion 90 are configured by utilizing the hardware and software thereof.

The data storage 20 is capable of storing machining plane model data 22, inversed tool model data 24, machining plane containing sphere region data 26, inversed tool model containing sphere region data 28, and tool reference plane model data 30. Plural sets of the aforesaid data may be stored.

The machining plane model data 22 describes a machining plane model arranged in an XYZ coordinate system, and is created by an external three dimensional CAD apparatus. The machining plane model data 22 describes the machining plane model by a plurality of basic shapes disposed in the XYZ coordinate system. Vertices, edges, and surfaces, for example, are used in the basic shapes. The machining plane model data 22 is input to the creating apparatus 10 of the present embodiment via the data input/output portion 90, and is stored in the data storage 20.

The inversed tool model data 24 describes an inversed tool model in which a tool model is inversely arranged in an XYZ coordinate system. The inversed tool model data 24 is created by the external 3D CAD apparatus. The tool model has a tool reference point that is located at the origin of the XYZ coordinate system. Like the machining plane model data 22, the inversed tool model data 24 describes the inversed tool model by a plurality of aforesaid basic shapes disposed in the XYZ coordinate system. The inversed tool model data 24 is input to the creating apparatus 10 of the present embodiment via the data input/output portion 90, and is stored in the data storage 20.

The machining plane containing sphere region data 26, the inversed tool model containing sphere region data 28, and the tool reference plane model data 30 are sets of data that are created by the data processor 50 in processes described later.

The data processor 50 comprises a grid sphere region determining processor 52, a machining plane containing sphere region identifying processor 54, an inversed tool model containing sphere region identifying processor 62, a tool reference plane containing sphere region identifying processor 70, and an offset point identifying processor 72. Within these units, the machining plane containing sphere region identifying processor 54 includes a vertex containing sphere region identifying processor 56, an edge containing sphere region identifying processor 58, and a surface containing sphere region identifying processor 60. Further, the inversed tool model containing sphere region identifying processor 62 includes a vertex containing sphere region identifying processor 64, an edge containing sphere region identifying processor 66, and a surface containing sphere region identifying processor 68.

The grid sphere region determining processor 52 performs a process to determine three dimensional grid points arranged with a predetermined grid interval within the XYZ coordinate system in which the machining plane model data 22 describes the machining plane model and also within the XYZ coordinate system in which the inversed tool model data 24 describes the inversed tool model. Further, the grid sphere region determining processor 52 performs a process for determining sphere regions, from the determined three dimensional grid points, in each of which the grid point is a center grid point (i.e. center point, or grid point) of the sphere. The sphere regions are determined to be within a range within $3^{1/2}/2$ times the grid interval.

The machining plane containing sphere region identifying processor 54 performs a step for identifying machining plane containing sphere regions in each of which a machining plane model which the machining plane model data 22 describes is at least partially contained from among the sphere regions set in the coordinate space of the XYZ coordinate system (the first XYZ coordinate system). Further, the machining plane containing sphere region identifying processor 54 performs a step for identifying nearest points on the machining plane model from the center grid points of the identified machining plane containing sphere regions. Thereupon, the machining plane containing sphere region data 26 which describes each of the identified machining plane containing sphere regions in association with its nearest point on the machining plane model from its center grid point.

As described above, the machining plane containing sphere region identifying processor 54 is provided with the vertex containing sphere region identifying processor 56, the edge containing sphere region identifying processor 58, and the surface containing sphere region identifying processor 60.

The vertex containing sphere region identifying processor 56 performs a step of extracting a vertex composing the machining plane model from the machining plane model data 22, a step of identifying sphere region in the first XYZ coordinate system containing the extracted vertex, and a step of storing the extracted vertex in association with the correspondingly identified sphere region in the storage 20. The processor 56 performs the above steps for all the vertices included in the machining plane model. The sphere regions that contain the vertices composing the machining plane model are thereby determined as a part of the machining plane containing sphere regions within the XYZ coordinate system in which the machining plane model is represented.

The edge containing sphere region identifying processor 58 performs a step of extracting edges composing the machining plane model from the machining plane model data 22, and a step of identifying a sphere region, for each extracted edge, in which a predetermined point within the extracted edge is contained as a source machining plane containing sphere region. Next, the edge containing sphere region identifying processor 58 determines twenty six sphere regions that circumscribe one of the identified source machining plane containing sphere regions as sphere regions that are search subjects. Then, for each sphere region that has been determined to be the search subject, a containing sphere region identifying process is performed. The containing sphere region identifying process comprises the following steps: calculating a nearest point on the edge from the center grid point of the sphere region, identifying a sphere region in which the calculated nearest point on the edge is contained as a machining plane containing sphere region, storing the identified machining plane containing sphere region in association with the nearest point in the storage 20 to be included in the machining plane containing sphere region data 26 in the case where the identified machining plane containing sphere region has not been stored therein. Further, the processor 58 determines twenty six sphere regions circumscribing the aforesaid identified machining plane containing sphere region as another set of sphere regions that is the search subject upon which the aforesaid containing sphere region identifying process is to be performed.

The surface containing sphere region identifying processor 60 extracts, from the machining plane model data 22, a surface composing the machining plane model and at least one vertex and edges composing a boundary of the surface, and retrieves the machining plane containing sphere regions that include the extracted vertex and/or edges from the machining plane containing sphere region data 26. Next, the surface containing sphere region identifying processor 60 determines the aforesaid retrieved machining plane containing sphere regions as boundary sphere regions for the extracted surface. The aforesaid processes are performed for each of the surfaces included in the machining plane model. Next, for each of the extracted surfaces, a sphere region that contains a predetermined point within the extracted surface and is adjacent to the plurality of boundary sphere regions is identified as a source machining plane containing sphere region. Next, twenty six sphere regions circumscribing the identified source machining plane containing sphere region are determined to be the search subjects. Then, for each of the sphere regions that was determined to be the search subject, a containing sphere region identifying process is performed. In the containing sphere region identifying process, a nearest point on the surface from the center grid point of the sphere region is calculated; a sphere region in which the calculated nearest point on the surface is contained and which is adjacent to the plurality of boundary sphere regions is identified as a machining plane containing sphere region; the identified machining plane containing sphere region is stored in association with the nearest point to be included in the machining plane containing sphere region data 26 in the case where the identified machining plane containing sphere region has not been included in the machining plane containing sphere region data 26; and another twenty six sphere regions that are adjacent to the identified machining plane containing sphere region are further determined to be the another set of search subjects. The aforementioned containing sphere region identifying process is performed until there are no remaining sphere regions that have not been determined to be search subjects. Thereupon, the surface containing sphere region identifying processor 60 newly determines a new set of machining plane containing sphere regions that have been identified to be another set of boundary sphere regions, then further identifies new sphere regions as being the respective source and search subjects in the same manner as described above; that is, the aforestated containing sphere region identifying process is iterated. All of the sphere regions that contain at least in part the surfaces extracted from the machining plane model data 22 are thereby identified as the machining plane containing sphere regions. The surface containing sphere region identifying processor 60 extracts all of the surfaces in sequence from the machining plane model data 22, and identifies the machining plane containing sphere regions for all of the surfaces contained in the machining plane model.

The inversed tool model containing sphere region identifying processor 62 performs a step for identifying inversed tool model containing sphere regions in which an inversed tool model is contained from among the sphere regions set in the XYZ coordinate system (the second XYZ coordinate system) in which the inversed tool model is represented. The XYZ coordinate system for the machining plane model and the XYZ coordinate system for the inversed tool model are different systems. Further, the inversed tool model containing sphere region identifying processor 62 performs a step for identifying a nearest point on the inversed tool model from the center grid point of the identified inversed tool model containing sphere region. The inversed tool model containing sphere region identifying processor 62 thereby creates the inversed tool model containing sphere region data 28. More specifically, the vertex containing sphere region identifying processor 64, the edge containing sphere region identifying processor 66, and the surface containing sphere region identifying processor 68 perform the same steps as did the machining plane containing sphere region identifying processor 54; i.e. performing steps for identifying the inversed tool model containing sphere regions for each of the vertices, edges, and surfaces composing the inversed tool model.

The tool reference plane containing sphere region identifying processor 70 uses the machining plane containing sphere regions included in the machining plane containing sphere region data 26 and the inversed tool model containing sphere regions included in the inversed tool model containing sphere region data 28 to perform a step for identifying tool reference plane containing sphere regions from among the sphere regions in the first XYZ coordinate system when the tool model is inversely represented therein. In this identifying, the processor 70 identifies sphere regions whose center grid points coincides with the tool reference point of the inversed tool model when the inversed tool model containing sphere regions are arranged inversely in the XYZ coordinate system so that one or more of the machining plane containing sphere region makes contact with one or more of the inversed tool model containing sphere regions. Further, upon identifying the tool reference plane containing sphere region, the tool reference plane containing sphere region identifying processor 70 further identifies the one or more machining plane containing sphere regions with which the one or more inversed tool model containing sphere regions make contact as one or more contact point containing sphere regions. The above processes may be performed for each of the sphere region in the coordinate system as selected.

The offset point identifying processor 72 performs the following steps for each of the identified one or more contact point containing sphere regions: retrieving, from the machining plane containing sphere region data 26, the nearest point on the machining plane model from the center grid point of the contact point containing sphere region; calculating a relative coordinate position from the center grid point of the contact point containing sphere region to the center grid point of the tool reference plane containing sphere region; retrieving, from the inversed tool model containing sphere region data storing means, the nearest point on the inversed tool model from the inversed tool model containing sphere region that has a relative position from the tool reference point to its center grid point that is equal to the calculated relative coordinate position; and calculating the offset candidate point by shifting the retrieved nearest point on the machining plane model by an amount equal to the coordinate position of the retrieved nearest point on the inversed tool model. Further, a step is performed for identifying, from the calculated one or more offset candidate points, an offset candidate point that is positioned within one of the tool reference plane containing sphere region and is positioned closest to the center grid point of the tool reference plane containing sphere region as an offset point. The identified offset point is stored together with the center grid point of the tool reference plane containing sphere region and is included in the tool reference plane model data 30 along with the other offset points that are identified in by the aforesaid processes. The tool reference plane model data 30 that represents the sphere regions containing the tool reference plane model in association with the nearest points on the tool reference plane model from their center grid points is thereby created and stored in the data storage 20.

Figure 2:
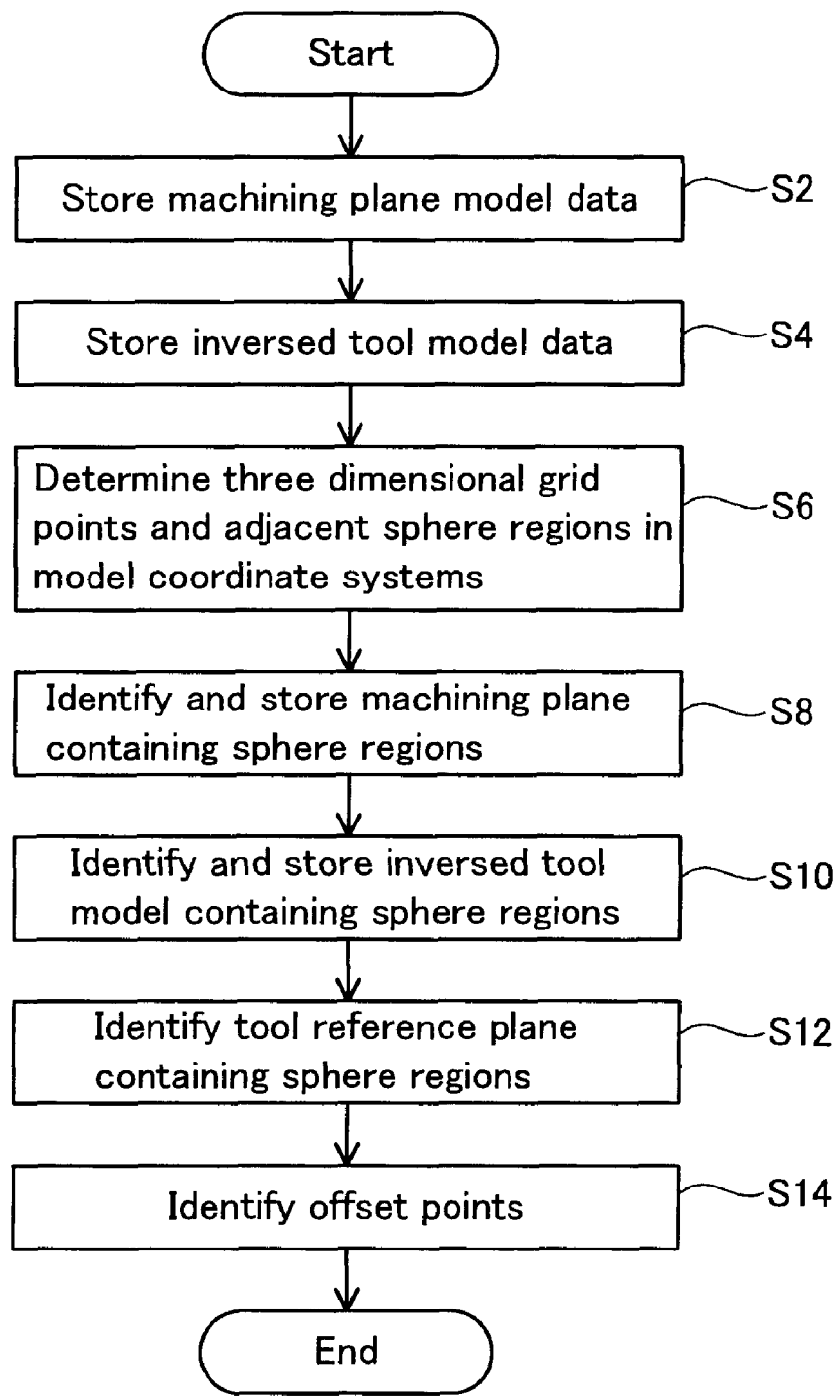
FIG. 2 shows a flow chart of the process for creating tool the reference plane model data.

FIG. 2 is a flowchart showing of the steps performed by the creating apparatus 10. The steps performed by the creating apparatus 10 will be described in detail along the flowchart shown in FIG. 2.

In step S2, the creating apparatus 10 stores the machining plane model data 22 input from the data input/output portion 90 in the data storage 20.

In step S4, the creating apparatus 10 stores the inversed tool model data 24 input from the data input/output portion 90 in the data storage 20.

In step S6, the grid sphere region determining processor 52 determines three dimensional grid points and sphere regions having these three dimensional grid points as their center within the XYZ coordinate system in which the machining plane model data 22 describes the machining plane model, and also within the XYZ coordinate system in which the inversed tool model data 24 describes the inversed tool model. A grid interval a of the three dimensional grid points is designated by an operator based on allowable error (required accuracy). A radius r of the sphere region is determined to be $3^{1/2}/2$ times the grid interval a.

In step S8, the machining plane containing sphere region identifying processor 54 performs the steps described above for identifying the machining plane containing sphere regions. The process of step S8 can be divided, in general, into three stages.

Figure 3:
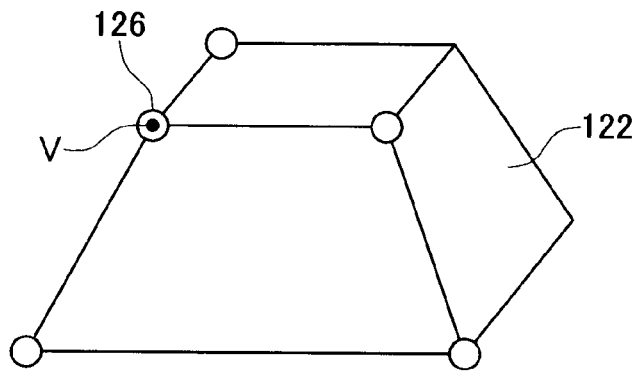
FIG. 3 shows a state of identifying a tool plane containing sphere region for vertices of a machining plane model.
Figure 4:
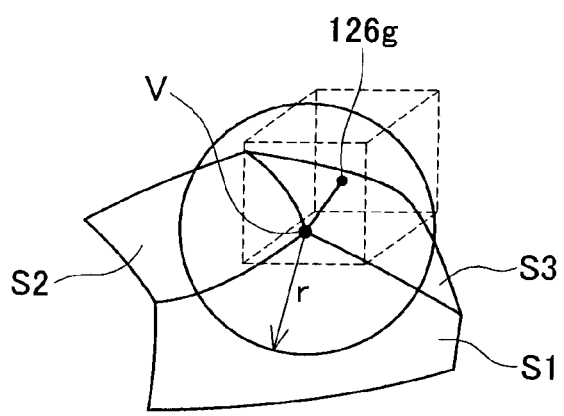
FIG. 4 shows a diagram that explains the geometric relationship between the vertices of the machining plane model and the tool plane containing sphere region.

In the first stage, as shown in FIG. 3, the vertex containing sphere region identifying processor 56 extracts one or more vertices V composing a machining plane model 122 from the machining plane model data 22, and identifies sphere regions containing each of the extracted vertices V as machining plane containing sphere regions 126. As shown in FIG. 4, since the vertex V is specified by three surfaces S1, S2, and S3, coordinate of the vertex V can be calculated by analyzing the points of intersection of the surfaces S1, S2, and S3. If the coordinate of the vertex V is found, it is possible to calculate the distance between the vertex V and each of the grid points, and to identify the grid points positioned within the radius r of the shown sphere region as center grid point 126g of the machining plane containing sphere region 126.

Figure 5:
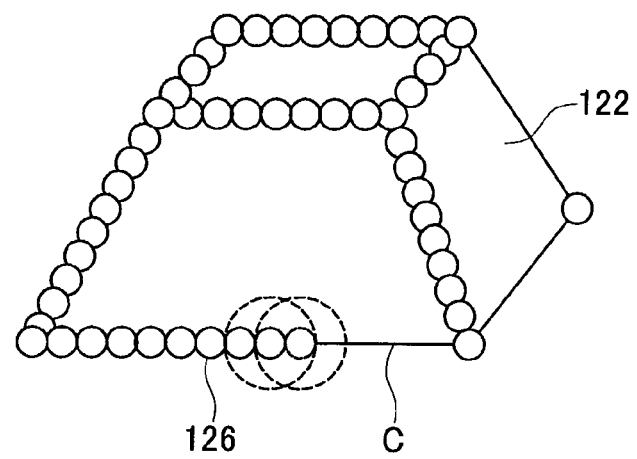
FIG. 5 shows a state of identifying a tool plane containing sphere region for edges of the machining plane model.
Figure 6:
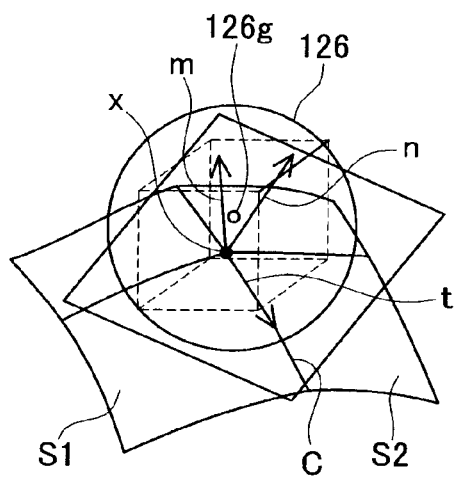
FIG. 6 shows a diagram that explains the geometric relationship between the edges of the machining plane model and the tool plane containing sphere region.

In the second stage, as shown in FIG. 5, the edge containing sphere region identifying processor 58 identifies sphere regions containing edges C composing the machining plane model data 22 as the machining plane containing sphere regions 126. As shown in FIG. 6, edges C is specified by intersecting line of the two surfaces S1 and S2. The nearest point x on the edge C from the center grid point 126g of the sphere region 126 can be found by analyzing the condition that a vector connecting the center grid point 126g and the nearest point x is perpendicular to a tangent vector t of the edge C at the nearest point x. Moreover, the tangent vector t of the edge C at the nearest point x can be specified as a vector that is perpendicular to both a normal vector m of the surface S1 at the nearest point x and a normal vector n of the surface S2 at the nearest point x. If the distance from the center 126g to the nearest point x is within the radius of the sphere region 126, the sphere region having the center grid point 126g can be identified as the machining plane containing sphere region 126.

The edge containing sphere region identifying processor 58 identifies the machining plane containing sphere regions 126 containing the edges C in the following sequence. In the processes described below, the determination of a previously identified sphere sequence, a newly identified sphere sequence, and a reserved sphere sequence is performed. First, the edge containing sphere region identifying processor 58 extracts, from the machining plane model data 22, an edge C and vertices V positioned at the ends of the edge C respectively. Next, the machining plane containing sphere regions 126 containing respective vertex V are retrieved from the machining plane containing sphere region data 26, and the machining plane containing sphere region 126 of one of the retrieved vertices V is determined to be the previously identified sphere sequence. Next, one sphere region containing the edge C and that is adjacent to the previously identified sphere sequence is identified, and is determined to be a source of the newly identified sphere sequence. Next, twenty six sphere regions circumscribing the source sphere region (i.e. a first sphere region in the newly identified sphere sequence) are determined to be search subjects, and a search is made upon the twenty six 'search subject' sphere regions for one sphere region which fulfills as the machining plane containing sphere region. Then, each time a machining plane containing sphere region 126 is identified by the above search, the search is carried out on twenty six sphere regions that are adjacent to the identified machining plane containing sphere region 126 which become the search subjects. The plural machining plane containing sphere regions 126 that extend in a series are thereby determined to be the newly identified sphere sequence. In the case where no machining plane containing sphere region 126 is contained in the twenty six sphere regions that have been determined to be the search subjects, the newly identified sphere sequence at that time is determined to be the previously identified sphere sequence, and the previously identified sphere sequence at that time is determined to be the reserved sphere sequence. A search is then made, based on the new previously identified sphere sequence, for another machining plane containing sphere region 126 that can become the source of a next newly identified sphere sequence. A plurality of sphere sequences each consisting of machining plane containing sphere regions 126 extending in respective series is determined by iterating (i.e., repeating) the above process. Accordingly, even in the case where a machining plane model 122 has a complex shape, a plurality of sphere sequences can be accumulated simultaneously as reserved sphere sequences.

In the case where the source of the newly identified sphere sequence is not present around the previously identified sphere sequence, the reserved sphere sequence that is most recently identified is determined to be the previously identified sphere sequence. Then, from among sphere regions that are adjacent to the previously identified sphere sequence, one sphere region containing the edge C is searched to be the source of the newly identified sphere sequence. If a source of the newly identified sphere sequence is identified, the search for the newly identified sphere sequence is conducted based on the new source. If a source of the newly identified sphere sequence is not present, the most recently identified reserved sphere sequence at that time is determined to be the previously identified sphere sequence. The step for identifying the machining plane containing sphere regions 126 ends at the time when the search for all the reserved sphere sequences has ended. The above process is carried out for each of the extracted edges.

The machining plane containing sphere regions 126 containing the edges C, and the nearest points on the machining plane model 122 from the center grid points 126g of the machining plane containing sphere regions 126 are respectively identified as described above, and are stored to be included in the machining plane containing sphere region data 26.

Figure 7:
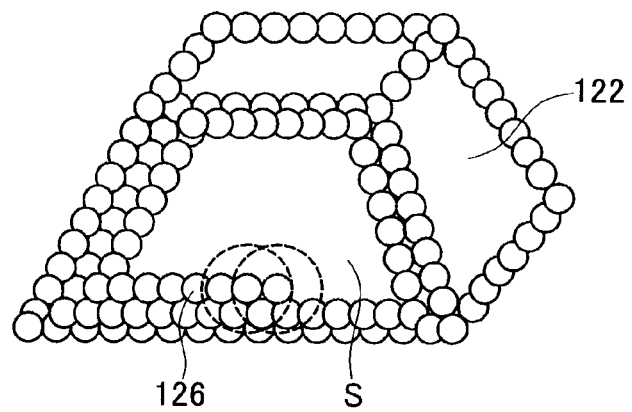
FIG. 7 shows the tool plane containing sphere regions in relation to surfaces of the machining plane model.
Figure 8:
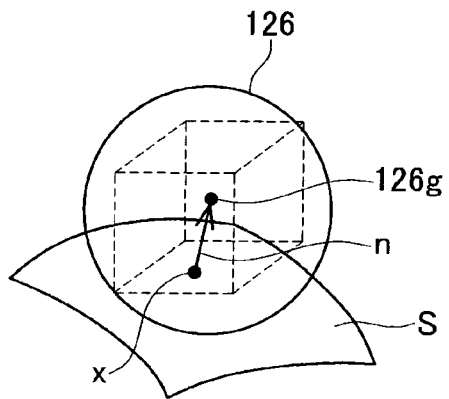
FIG. 8 shows a diagram that explains the geometric relationship between the surfaces of the machining plane model and the tool plane containing sphere region.

In the third stage, as shown in FIG. 7, the surface containing sphere region identifying processor 60 identifies the sphere regions containing the surfaces S composing the machining plane model data 22 to be the machining plane containing sphere regions 126. As shown in FIG. 8, a nearest point x on the surface S from the center grid point 126g of the sphere region 126 can be identified by analyzing the condition that the normal vector n of the surface S at the nearest point x is parallel with a vector connecting the center grid point 126g and the nearest point x. If the distance from the center grid point 126g to the nearest point x is within the radius of the sphere region 126, the aforesaid sphere region having the center grid point 126g is identified as the machining plane containing sphere region 126. This process is performed for each of the machining plane containing sphere regions 126 and for each surface.

The surface containing sphere region identifying processor 60 identifies the machining plane containing sphere regions 126 containing the surface S in the following sequence. In these processes, as well, the determination of the previously identified sphere sequence, newly identified sphere sequence, and reserved sphere sequence is performed as required.

First, the surface containing sphere region identifying processor 60 extracts, from the machining plane model data 22, the surface S and the vertices V and edges C positioned at the edges thereof. Next, the machining plane containing sphere regions 126 containing the extracted vertices V and/or the edges C are retrieved from the machining plane containing sphere region data 26, and the retrieved machining plane containing sphere regions 126 are determined to be the set of the previously identified sphere sequence. Next, one sphere region that contains the surface S and is adjacent to one of the spheres in the previously identified sphere sequence is identified, and is determined to be the source machining plane containing sphere region for the newly identified sphere sequence. Next, twenty six sphere regions circumscribing the sphere region identified as the source of the newly identified sphere sequence are determined to be search subjects, and one of the machining plane containing sphere regions 126, from among the twenty six sphere regions that were determined to be the search subjects, in which the surface S is contained and is adjacent to the previously identified sphere sequence are identified. Then, each time one machining plane containing sphere region 126 is identified accordingly, twenty six sphere regions that are adjacent to that machining plane containing sphere region 126 become a new set of the search subjects. The machining plane containing sphere regions 126 that extend in a series along the edge of the surface S are thereby identified as the newly identified sphere sequence. Link information representing the order of the identification is stored in the storage 20.

In the case where machining plane containing sphere regions 126 are not present in the twenty six sphere regions that had been determined to be the search subjects, the newly identified sphere sequence at that time is determined to be a new previously identified sphere sequence, and the previously identified sphere sequence at that time is determined to be one of the reserved sphere sequences. A search is then made, based on the new previously identified sphere sequence, for another machining plane containing sphere region 126 that can become the source sphere region for a newly identified sphere sequence. A plurality of sphere sequences consisting of machining plane containing sphere regions 126 extending in respective series is identified by iterating the above process. Accordingly, even in the case where a machining plane model 122 has a complex shape, a plurality of sphere sequences can be accumulated simultaneously as reserved sphere sequences.

In the case where the source machining plane containing sphere region 126 that is the source of the newly identified sphere sequence is not present around the previously identified sphere sequence, the most recently identified one of the reserved sphere sequences is determined to be new previously identified sphere sequence. Then, the one or more machining plane containing sphere regions 126 composing the previously identified sphere sequence is selected in the sequencing order, and the aforesaid search for the machining plane containing sphere regions 126 is made. If a source machining plane containing sphere region 126 is identified, the search is conducted based on the source of newly identified sphere sequence. If the source machining plane containing sphere region 126 is not present, the most recently identified reserved sphere sequence at that time is determined to be the previously identified sphere sequence. The step for identifying the machining plane containing sphere regions 126 ends at the time when the search for all the reserved sphere sequence s has ended.

The machining plane containing sphere regions 126 containing the surface S, and the nearest point on the machining plane model 122 from the center grid points 126*g* of the machining plane containing sphere regions 126 are respectively identified as described above, and are stored to be included in the machining plane containing sphere region data 26. At this stage, all of the machining plane containing sphere regions 126 containing the surfaces, and all of the nearest points x on the machining plane model 122 that are closest to the center grid points 126*g* of the machining plane containing sphere regions 126 are identified, and are included in the machining plane containing sphere region data 26.

Figure 9:
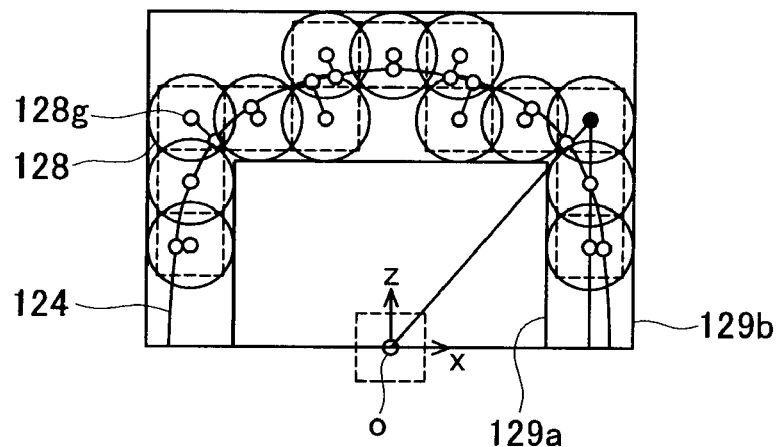
FIG. 9 shows a state in which an inversed tool model containing sphere region for an inversed tool model has been identified.

Next, in step S10, as shown in FIG. 9, the inversed tool model containing sphere region identifying processor 62 performs a step for identifying inversed tool model containing sphere regions 128 that contain the inversed tool model 124 described by the inversed tool model data 24. The process of step S10 is performed identically with the process of identifying the machining plane containing sphere regions 126 of S8, which has been described above. That is, the step for identifying the inversed tool model containing sphere regions 128 can be divided, in general, into three stages. In the first stage, the inversed tool model containing sphere regions 128 that contain vertices composing an inversed tool model 124 are determined using the vertex containing sphere region identifying processor 64 of the inversed tool model containing sphere region identifying processor 62. In the second stage, the inversed tool model containing sphere regions 128 that contain edges composing the inversed tool model 124 are determined using the edge containing sphere region identifying processor 66 of the inversed tool model containing sphere region identifying processor 62. In the third stage, the inversed tool model containing sphere regions 128 that contain surfaces composing the inversed tool model 124 are determined using the surface containing sphere region identifying processor 68 of the inversed tool model containing sphere region identifying processor 62. All of the inversed tool model containing sphere regions 128 containing the inversed tool model 124, and all of the nearest points x on the inversed tool model 124 that are closest from center grid points 128*g* of the inversed tool model containing sphere regions 128 are thereby identified, and are included in the inversed tool model containing sphere region data 28. Further, as shown in FIG. 9, the inversed tool model containing sphere region identifying processor 62 identifies an internal contact box region 129*a* that makes contact with the identified inversed tool model containing sphere regions 128 from an internal side with respect to the tool shape, and an external contact box region 129*b* that makes contact with the identified inversed tool model containing sphere regions 128 from an external side with respect to the tool shape. these regions are stored to be included in the inversed tool model containing sphere region data 28.

In step S12, the tool reference plane containing sphere region identifying processor 70 performs a step for identifying the aforesaid tool reference plane containing sphere regions. The tool reference plane containing sphere region is a sphere region containing a tool reference plane that is offset from the machining plane model 122 by an amount equal to a tool shape that can be identified from the inversed tool model.

Figure 10:
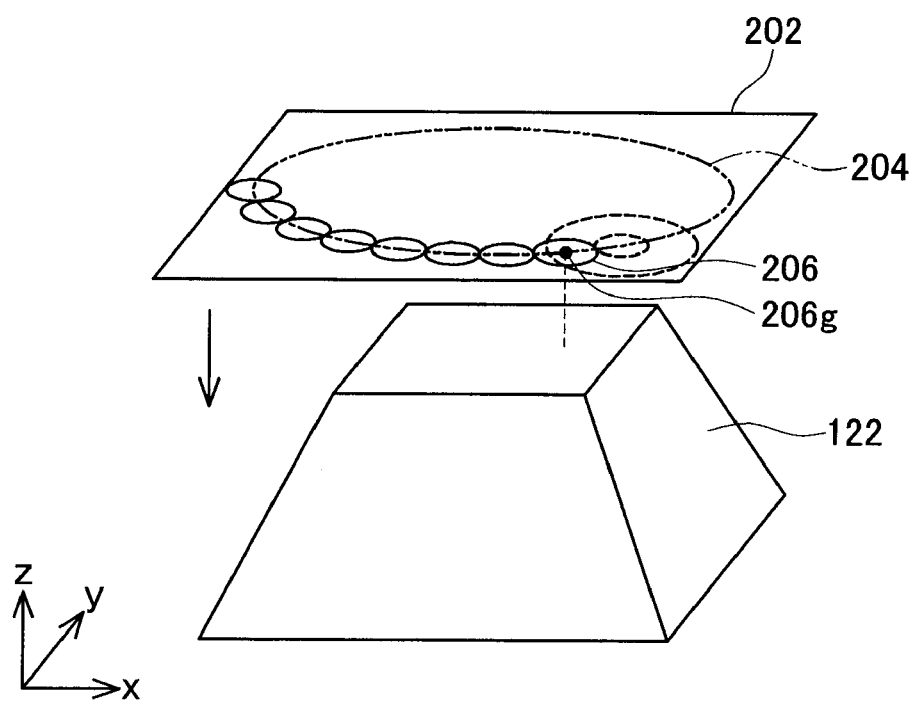
FIG. 10 shows a state in which a reference plane exterior of the machining plane model has been determined.
Figure 11:
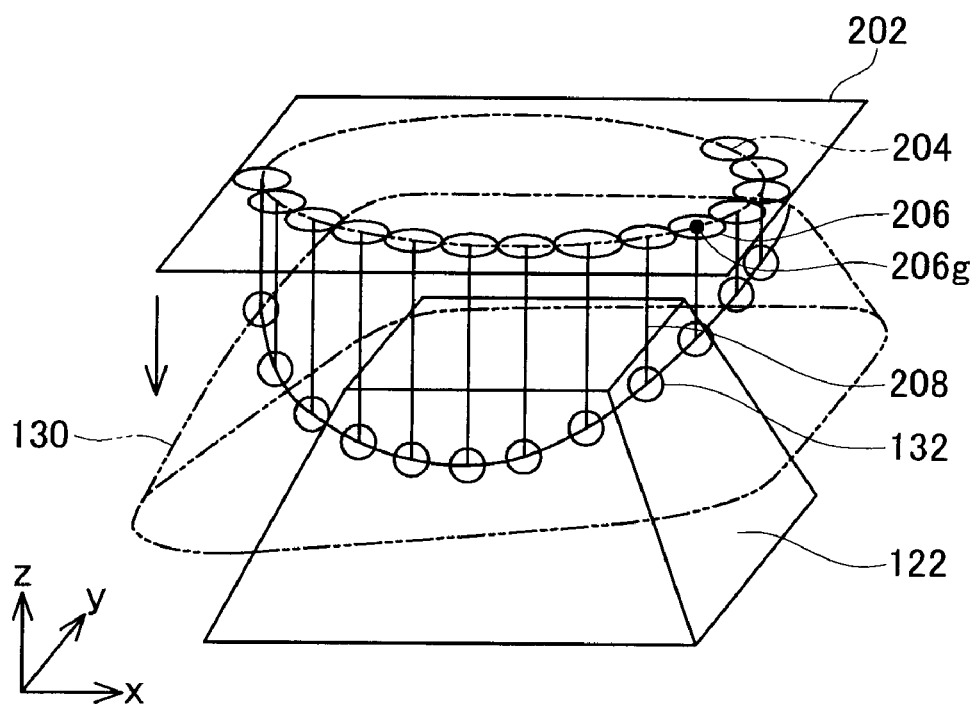
FIG. 11 shows a diagram that explains a process for determining a search axis in a Z axis direction.

First, as shown in FIG. 10, the tool reference plane containing sphere region identifying processor 70 determines a reference plane 202 that is spatially apart from the machining plane model 122 in the XYZ coordinate system in which the machining plane model 122 is arranged. Next, the tool reference plane containing sphere region identifying processor 70 determines a reference ring-shaped line 204 on the reference plane 202. There is no particular restriction on the shape of the reference ring-shaped line 204. Next, all of the sphere regions 206 containing the reference ring-shaped line 204, and the center grid points 206*g* of the aforesaid sphere regions 206 are identified. Next, as shown in FIG. 11, the tool reference plane containing sphere region identifying processor 70 determines, for each identified center grid point 206*g* on the reference plane 202, a search axis 208 parallel to a Z axis and passing through the center grid point 206*g*. Then, sphere regions containing the search axis 208 are determined to be a set of search subjects, and the tool reference plane containing sphere region 132 is identified from among the sphere regions determined to be the search subjects. The sphere regions containing the search axis 208 can be identified sequentially using, for example, a 3DDDA (3-D Digital Differential Analyzer).

Figure 12:
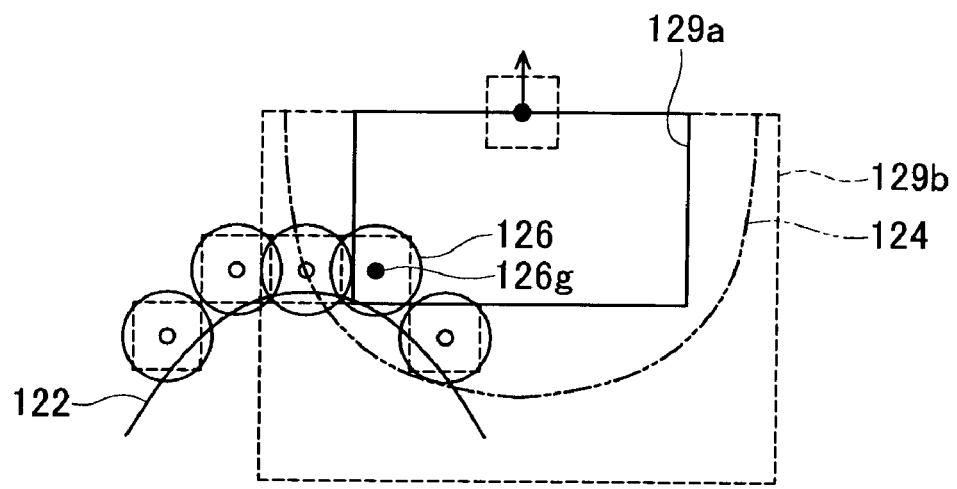
FIG. 12 shows a positional relationship in which the machining plane model interferes with an inversely arranged inversed tool model.
Figure 13:
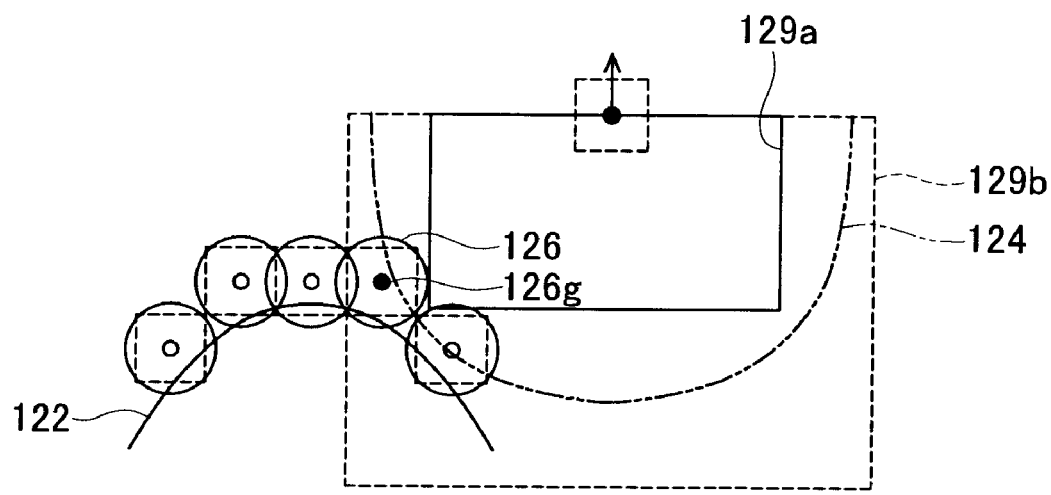
FIG. 13 shows a positional relationship in which the machining plane model makes contact with the inversely arranged inversed tool model.
Figure 14:
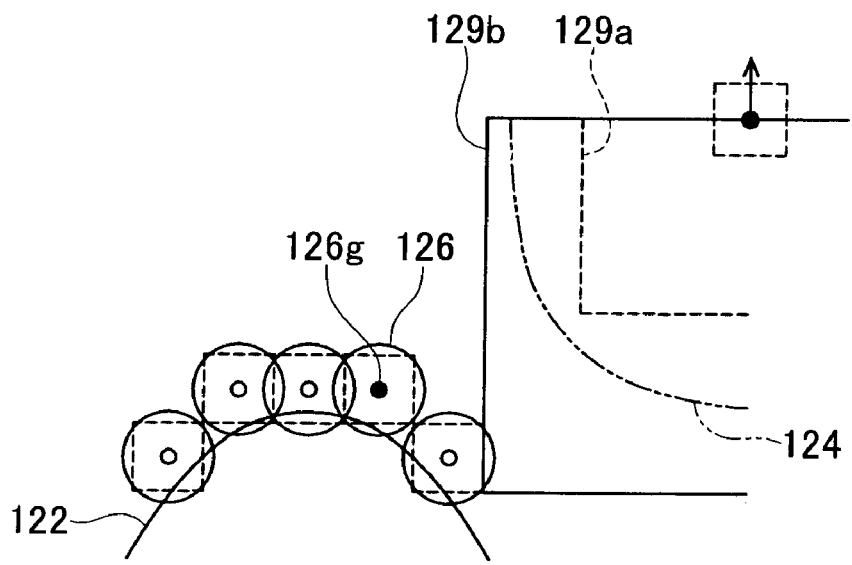
FIG. 14 shows a positional relationship in which the machining plane model is separate from the inversely arranged inversed tool model.

The tool reference plane containing sphere region 132 is a sphere region that has its center grid point coinciding with the tool reference point of the inversed tool model when the tool model is arranged at the according position. Among all of the center grid points in the coordinate system upon which the tool reference point of the inversed tool model can be arranged to coincide, the tool reference plane containing sphere region fulfills the condition that, when the tool reference point is arranged to coincide with its center grid point, at least one of the inversed tool model containing regions 128 which have been arranged inversely makes contact with one of the machining plane containing sphere regions 126. In order to identify this type of sphere regions, the internal contact box region 129a and the external contact box region 129b which are included in the inversed tool model containing sphere region data 28 are utilized in an inversed arrangement. As shown in FIG. 12, when the internal contact box region 129a and the external contact box region 129b are inversely arranged with the center grid point of the 'target' sphere region being arranged to coincide the tool reference point, if at least one center grid point 126g of at least one of the machining plane containing sphere regions 126 is positioned within the inversed internal contact box region 129a, it is possible to determine that the 'target' sphere region is too close to the machining plane containing sphere regions 126, and thus it cannot be determined as the tool reference plane containing sphere region 132. Further, as shown in FIG. 14, if the center grid points 126g of all the machining plane containing sphere regions 126 are positioned to the exterior of the inversely arranged external contact box region 129b, it is possible to determine that the 'target' sphere region is too far away from the machining plane containing sphere regions 126, and thus it cannot be determined as the tool reference plane containing sphere region 132. Alternatively, as shown in FIG. 13, if the center grid points 126g of all the machining plane containing sphere regions 126 are positioned to the exterior of the inversely arranged internal contact box region 129a and the center grid point 126g of at least one of the machining plane containing sphere regions 126 is positioned within the inversely arranged external contact box region 129b, it is possible to determine that the 'target' sphere region is the tool reference plane containing sphere region 132. The center grid points 126g that are positioned within the inverted external contact box region 129b are identified to be contact point containing sphere regions showing the contact position of the machining plane containing sphere regions 126 and the inverted inversed tool model containing sphere regions 128. Usually, a plurality of machining plane containing sphere regions 126 is determined to be contact point containing sphere regions for each tool reference plane containing sphere region 132.

Figure 15:
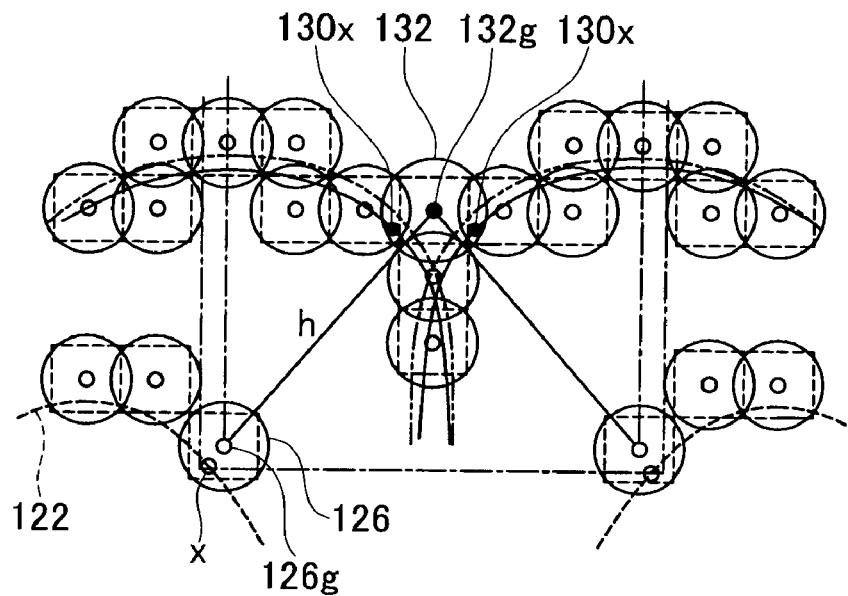
FIG. 15 shows a diagram that explains a process for identifying an offset point.

After the tool reference plane containing sphere regions 132 have been identified, in the following step S14, a process of identifying offset points is performed by the offset point identifying processor 72 for each of the identified tool reference plane containing sphere regions 132. As shown in FIG. 15, the offset point identifying processor 72 first identifies an offset candidate point 130x for each of the contact point containing sphere regions 126 that were identified along with the tool reference plane containing sphere regions 132. The offset candidate point 130x is identified using the following step sequence. Initially, the nearest points x on the machining plane model 122 from the center grid points 126g of the contact point containing sphere regions 126 are respectively retrieved from the machining plane containing sphere region data 26. Next, a relative coordinate position (h in the figure) is calculated from the center grid point 126g of the contact point containing sphere region 126 to the center grid point 132g of the tool reference plane containing sphere region 132. Next, the nearest point x of the inversed tool model containing sphere region 128 that has the coordinates of the center grid point 128g equal to the calculated relative coordinate position h is retrieved from the inversed tool model containing sphere region data 28. Next, the nearest point x on the retrieved machining plane model 122 is shifted horizontally by an amount equal to the coordinate position of the nearest point x on the retrieved inversed tool model 124, and this point is determined to be the offset candidate point 130x. The offset candidate point 130x is the nearest point x on the inversed tool model 124 closest to the center grid point 132g of the tool reference plane containing sphere region 132 when the inversed tool model 124 has been disposed coinciding with the center grid point 126g of the contact point containing sphere region 126. After one or more offset candidate points 130x have been calculated in the aforesaid manner, the offset point identifying processor 72 determines the point positioned nearest to the respective center grid point 132g of the tool reference plane containing sphere region 132 to be an offset point, and stores these offset points together with the tool reference plane containing sphere region 132 to be included in the tool reference plane model data 30. The identified offset points are points that represent the tool reference plane model.

As aforestated, the processes of step S12 and step S14 are iterated, thereby sequentially identifying the tool reference plane containing sphere regions 132 and the offset points thereof. The search for the tool reference plane containing sphere regions 132 is performed in the sequence described below based on the tool reference plane containing sphere regions 132 that have already been identified. First, in the stage shown in FIG. 11, a plurality of the tool reference plane containing sphere regions 132 are identified on the tool reference plane model 130 along the circumference with intervals in between the sphere regions. Thus, in the following processes, tool reference plane containing sphere regions 132 that are present between the previously identified tool reference plane containing sphere regions 132 are identified. In order to do so, a search axis is determined by a binary complement method, and a search is made for the tool reference plane containing sphere regions 132 along the search axis. The binary complement method uses the center grid points and the offset points of two tool reference plane containing sphere regions 132 that have already been identified, and for each offset point, calculates an average vector of the normal vectors of the tool reference plane model (i.e., vectors passing through the center grid points and the offset point), and to calculate a middle point of the two offset points, and determine an axis passing through the calculated center point and parallel to the calculated average vector to be a search axis. By using the binary complement method to determine the search axis for each two separated tool reference plane containing sphere regions 132 and thereby continuing to identify the tool reference plane containing sphere regions 132, it is possible to identify the adjacent tool reference plane containing sphere regions 132 on the circumference of the tool reference plane model 130.

Figure 16:
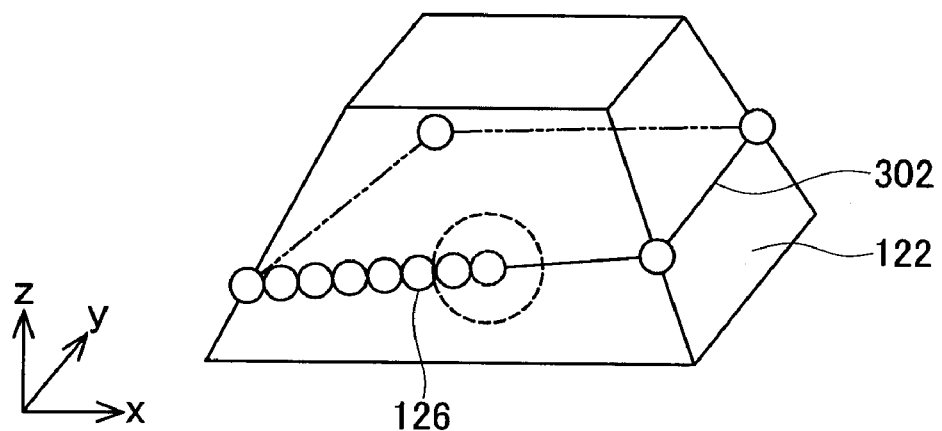
FIG. 16 shows a state in which a reference plane has been determined such that the machining plane model passes therethrough.
Figure 17:
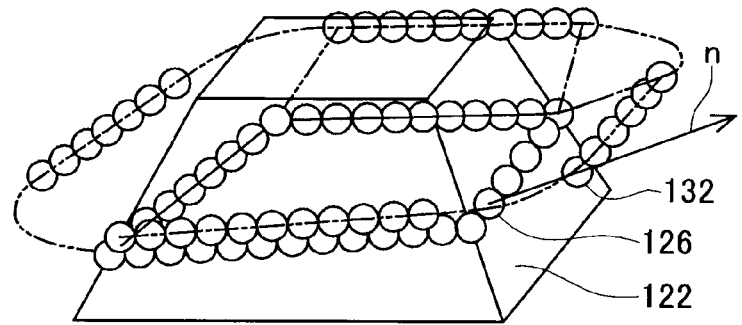
FIG. 17 shows a diagram that explains a process for determining a search axis in a normal vector of the machining plane model.
Figure 18:
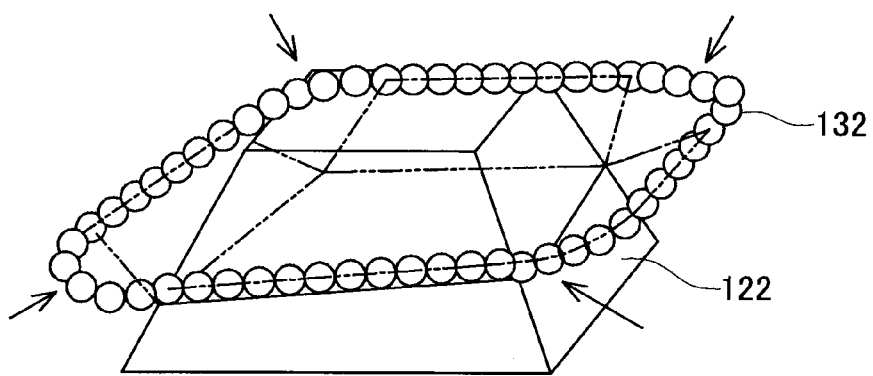
FIG. 18 shows tool reference plane containing sphere regions that are initially identified as a previously identified sphere sequence.

The process of identifying the adjacent tool reference plane containing sphere regions 132 on the circumference of the tool reference plane model 130 can also be performed in the sequence described below. First, as shown in FIG. 16, a reference plane 302 passing through the machining plane model 122 is determined, and the machining plane containing sphere regions 126 containing the reference plane 302 are retrieved from the machining plane containing sphere region data 26. Next, as shown in FIG. 17, for each of the retrieved machining plane containing sphere regions 126, the normal vector n of the machining plane model 122 passing through the nearest point x of the retrieved machining plane containing sphere region 126 is determined to be a search axis, and a search is made for the tool reference plane containing sphere regions 132. The tool reference plane containing sphere regions 132 identified in the manner described above are located on the tool reference plane model 130 along the circumference thereof with spacing therebetween. As a result, as shown in FIG. 18, the search axis between the tool reference plane containing sphere regions 132 that are separate from one another is determined by the binary complement method, and the tool reference plane containing sphere regions 132 continue to be identified. It is thereby possible to identify the adjacent tool reference plane containing sphere regions 132 on the circumference of the tool reference plane model 130.

After the tool reference plane containing sphere regions 132 along the circumference have been identified, a process of identifying the remaining tool reference plane containing sphere regions 132 is performed. In this process, the determination of the previously identified sphere sequence, newly identified sphere sequence, and reserved sphere sequence is performed as required. First, the tool reference plane containing sphere regions 132 on the circumference of the tool reference plane model 130 are determined to be the previously identified sphere sequence. Then, one of the tool reference plane containing sphere regions 132 from among the sphere regions adjacent to the previously identified sphere sequence is identified as the search subject.

Figure 19:
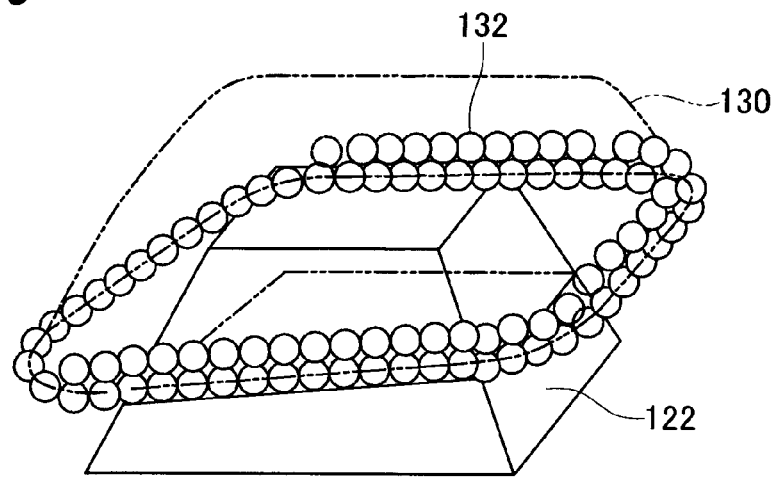
FIG. 19 shows a diagram that explains a process for identifying tool reference plane containing sphere regions as a newly identified sphere sequence.

Next, the identified tool reference plane containing sphere region 132 is determined to be a source of the newly identified sphere sequence which is to be identified in the below. Twenty six sphere regions that are adjacent (in a circumscribing manner) to the source tool reference plane containing sphere region 132 are determined to be search subjects, and one tool reference plane containing sphere region 132 adjacent to the currently connecting bodies is identified therefrom. Each time one tool reference plane containing sphere region 132 is identified, twenty six sphere regions that circumscribe that identified tool reference plane containing sphere region 132 become the search subjects. The tool reference plane containing sphere regions 132 that extend in a series are thereby determined to be the newly identified sphere sequence, as shown in FIG. 19. The link information that represents the order in which the spheres were identified is stored in the storage 20 in association with the identified sequences. In the case where tool reference plane containing sphere region 132 is not present in the twenty six sphere regions that have been determined to be the search subjects, the newly identified sphere sequence at that time is determined to be a new set of previously identified sphere sequence, and the previously identified sphere sequence at that time is determined to be a new set of reserved sphere sequence. A search is then made, based on the new set of previously identified sphere sequence, for a tool reference plane containing sphere region 132 that can be the source sphere for another new set of newly identified sphere sequence. A plurality of connecting bodies consisting of tool reference plane containing sphere regions 132 extending in a series are identified by iterating the above process. Then, in the case where, for example, a tool reference plane model 130 has a complex shape (e.g., in the case where the machining plane model 122 has a complex shape), a plurality of sphere sequences are accumulated as reserved sphere sequences.

In the case where the tool reference plane containing sphere region 132 that can be the source sphere region for the another new set of newly identified sphere sequence is not present, the most recently identified reserved sphere sequence is determined to be the previously identified sphere sequence. A search for the tool reference plane containing sphere region 132 is conducted by going through the tool reference plane containing sphere regions 132 that compose the previously identified sphere sequence. If a tool reference plane containing sphere region 132 that is the source sphere region for a yet another set of newly identified sphere sequence is identified, a search is newly made for the yet another set of newly identified sphere sequence using the aforesaid source tool reference plane containing sphere region 132. If a tool reference plane containing sphere region 132 for becoming the source sphere region for the yet another set of newly identified sphere sequence is not present, the most recently identified reserved sphere sequence at that time is determined to be the previously identified sphere sequence. The process for identifying the tool reference plane containing sphere regions 132 ends at the time when the search for all the reserved sphere sequences has ended.

All of the tool reference plane containing sphere regions 132, and the nearest points on the tool reference plane model 130 from the center grid points 132g of the tool reference plane containing sphere regions 132 are identified as described above, and are stored to be included in the tool reference plane model data 30. The tool reference plane model data 30 becomes data representing the tool reference plane model 130 comprised of the stored nearest points, and is suitable for use in calculating a tool movement path of an NC machine tool.

A specific embodiment of the present invention is described above, but this merely illustrates some possibilities of the invention and does not restrict the claims thereof. The art set forth in the claims includes variations and modifications of the specific examples set forth above.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

The invention claimed is:

1. An apparatus for calculating a tool reference plane that is offset from a machining plane model in accordance with a tool shape model, the apparatus comprising:

a means for storing machining plane model data that describes the machining plane model that is arranged in a first XYZ coordinate system;

a means for storing inversed tool shape data that describes the tool shape model that is inversely arranged in a second XYZ coordinate system, wherein the tool shape model has a tool reference point that is located at an origin of the second XYZ coordinate system;

a means for determining a plurality of sphere regions in the first XYZ coordinate system and the second XYZ coordinate system respectively, wherein center points of the sphere regions are grid points that are arranged three dimensionally with a predetermined grid interval, and a radius of each sphere region is equal to $3^{1/2}/2$ times the predetermined grid interval;

a means for identifying a plurality of machining plane containing sphere regions, in which the machining plane model is contained, from among the plurality of sphere regions in the first XYZ coordinate system, wherein the means further identifies, for each machining plane containing sphere region, a nearest point on the machining plane model from the center point of the machining plane containing sphere region;

a means for storing machining plane containing sphere region data describing each of the identified machining plane containing sphere regions in association with the nearest point on the machining plane model identified based on the center point of the machining plane containing sphere region;

a means for identifying a plurality of inversed tool model containing sphere regions, in which the inversed tool model is contained, from among the plurality of sphere regions in the second XYZ coordinate system, wherein the means further identifies, for each inversed tool model containing sphere region, a nearest point on the inversed tool model from the center point of the inversed tool model containing sphere region;

a means for storing inversed tool model containing sphere region data describing each of the identified inversed tool model containing sphere regions in association with the nearest point on the inversed tool model identified based on the center point of the inversed tool model containing sphere region;

a means for identifying a plurality of tool reference plane containing sphere regions from among the plurality of sphere regions in the first XYZ coordinate system and one or more contact point containing sphere regions from among the plurality of machining plane containing sphere regions based on the machining plane containing sphere region data and the inversed tool model containing sphere region data, wherein:

a sphere region in the first XYZ coordinate system is identified as a tool reference plane containing sphere region if one or more inversed tool model containing sphere regions make contact with one or more machining plane containing sphere regions when the sphere region has its center point coinciding with the tool reference point of the inversed tool model and the inversed tool model containing sphere regions are arranged inversely in the first XYZ coordinate system, and the one or more machining plane containing sphere regions making contact with the one or more inversed tool model containing sphere regions are identified as contact point containing sphere regions;

a means for identifying a plurality of offset points, the means performing, for each of the one or more identified contact point containing sphere regions, an offset candidate point identifying process for calculating one or more offset candidate points and further identifying one of the identified offset candidate points, which is contained within the tool reference plane containing sphere region and is closest to the center grid point of the tool reference plane containing sphere region, as an offset point, wherein the offset candidate point identifying process comprises:

retrieving, from the machining plane containing sphere region data, the nearest point on the machining plane model from the center point of the contact point containing sphere region;

calculating a relative coordinate position from the center point of the contact point containing sphere region to the center point of the tool reference plane containing sphere region;

identifying, from the inversed tool model containing sphere region data, one inversed tool model containing sphere region that has a relative position from the tool reference point to its center point equaling to the calculated relative coordinate position;

retrieving, from the inversed tool model containing sphere region data, the nearest point on the inversed tool model from the identified inversed tool model containing sphere region; and calculating the offset candidate point by shifting the retrieved nearest point on the machining plane model by an amount equal to the coordinate position of the retrieved nearest point on the inversed tool model; and a means for storing tool reference plane model data that describes coordinate positions of the plurality of identified offset points.

2. The apparatus for calculating a tool reference plane as in claim 1, wherein the means for identifying the plurality of machining plane containing sphere regions further comprises a means for identifying machining plane vertex containing sphere regions, a means for identifying machining plane edge containing sphere regions, and a means for identifying machining plane surface containing sphere regions, the means for identifying machining plane vertex containing sphere regions extracts, based on the machining plane model data, a plurality of vertices composing the machining plane model, identifies, for each extracted vertex, a sphere region in which the vertex is contained, and stores the identified sphere region in association with the extracted vertex in the means for storing machining plane containing sphere region data, the means for identifying machining plane edge containing sphere regions extracts, based on the machining plane model data, a plurality of edges composing the machining plane model, identifies, for each extracted edge, a sphere region in which a predetermined point within the edge is contained as a source machining plane containing sphere region, determines twenty-six sphere regions that circumscribe the identified source machining plane containing sphere region to be search subjects, and performs, for each sphere region that has been determined as the search subject, a containing sphere region identifying process, wherein the containing sphere region identifying process comprises:

calculating a nearest point on the edge from the center point of the sphere region;

identifying a sphere region in which the calculated nearest point on the edge is contained as a machining plane containing sphere region;

storing the identified machining plane containing sphere region in association with the nearest point in the machining plane containing sphere region data in a case where the identified machining plane containing sphere region has not been stored in the means for storing the machining plane containing sphere region data; and further determining twenty-six sphere regions that circumscribe the identified machining plane containing sphere region to be search subjects;

the means for identifying machining plane surface containing sphere regions (1) extracts, based on the machining plane model data, a plurality of surfaces composing the machining plane model and vertices and edges composing a boundary of each of the surfaces, (2) retrieves a plurality of machining plane containing sphere regions including the extracted vertices and/or edges from the machining plane containing sphere region data, (3) determines the plurality of retrieved machining plane containing sphere regions as a plurality of boundary sphere regions, (4) identifies, for each of the extracted surfaces, a sphere region that contains a predetermined point within the extracted surface and is adjacent to the plurality of boundary sphere regions as a source machining plane containing sphere region, (5) determines each of the twenty-six sphere regions that circumscribe the identified source machining plane containing sphere region to be a search subject, and (6) performs, for each of the search subjects, a containing sphere region identifying process, wherein the containing sphere region identifying process comprises:

calculating a nearest point on the surface from the center point of the sphere region;

identifying a sphere region in which the calculated nearest point on the surface is contained and is adjacent to the plurality of boundary sphere regions as a machining plane containing sphere region, storing the identified machining plane containing sphere region in association with the nearest point in the means for storing the machining plane containing sphere region data in a case where the identified machining plane containing sphere region has not been stored in the means for storing the machining plane containing sphere region data; and further determining twenty-six sphere regions that circumscribe the identified machining plane containing sphere region as additional search subjects;

wherein the containing sphere region identifying process is iterated after another set of boundary sphere regions are newly determined from the plurality of machining plane containing sphere regions that has been identified in the containing sphere region identifying process, and new sphere regions as the source machining plane containing sphere regions and the search subjects are identified.

3. The apparatus for calculating a tool reference plane as in claim 1, wherein the means for identifying the plurality of inversed tool model containing sphere regions comprises a means for identifying inversed tool model vertex containing sphere regions, a means for identifying inversed tool model edge containing sphere regions, and a means for identifying inversed tool model surface containing sphere regions, the means for identifying inversed tool model vertex containing sphere regions extracts, based on the inversed tool model data, a plurality of vertices composing the inversed tool model, identifies, for each extracted vertex, a sphere region in which the vertex is contained, and stores the identified sphere region in association with the extracted vertex in the means for storing inversed tool model containing sphere region data, the means for identifying inversed tool model edge containing sphere regions extracts, based on the inversed tool model data, a plurality of edges composing the inversed tool model, identifies, for each extracted edge, a sphere region in which a predetermined point within the edge is contained as a source inversed tool model containing sphere region, determines twenty-six sphere regions that circumscribe the identified source inversed tool model containing sphere region to be search subjects, and performs, for each search subject, a containing sphere region identifying process, wherein the containing sphere region identifying process comprises:

calculating a nearest point on the edge from the center point of the search subject;

identifying a sphere region in which the calculated nearest point on the edge is contained as an inversed tool model containing sphere region;

storing the identified inversed tool model containing sphere region in association with the nearest point in the means for storing the inversed tool model containing sphere region data in a case where the identified inversed tool model containing sphere region has not been stored in the means for storing the inversed tool model containing sphere region data; and further determining twenty-six sphere regions that circumscribe the identified inversed tool model containing sphere region to be search subjects;

the means for identifying the plurality of inversed tool model surface containing sphere regions (7) extracts, based on the inversed tool model data, a plurality of surfaces composing the inversed tool model and vertices and edges composing a boundary of each surface, (8) retrieves a plurality of inversed tool model covering sphere regions including the extracted vertices and/or edges from the inversed tool model containing sphere region data, (9) determines the plurality of retrieved inversed tool model covering sphere regions as a plurality of boundary sphere regions, (10) identifies, for each of the extracted surfaces, a sphere region that contains a predetermined point within the extracted surface and is adjacent to the plurality of boundary sphere regions as a source inversed tool model containing sphere region, (11) determines each of the twenty-six sphere regions that circumscribe the identified source inversed tool model containing sphere region to be a search subject, and (12) performs, for each of the search subjects, a containing sphere region identifying process, wherein the containing sphere region identifying process comprises:

calculating a nearest point on the surface from the center point of the search subject;

identifying a sphere region in which the calculated nearest point on the surface is contained and is adjacent to the plurality of boundary sphere regions as an inversed tool model containing sphere region;

storing the identified inversed tool model containing sphere region and the nearest point in association in the means for storing the inversed tool model containing sphere region data in a case where the identified inversed tool model containing sphere region has not been stored in the means for storing the inversed tool model containing sphere region data; and further determining twenty-six sphere regions that circumscribe the identified inversed tool model containing sphere region additionally as another plurality of search subjects;

wherein the containing sphere region identifying process is iterated after another set of boundary sphere regions are newly determined from the plurality of machining plane containing sphere regions that has been identified in the containing sphere region identifying process, and new sphere regions as the source machining plane containing sphere regions and the search subjects are identified.

4. The apparatus for calculating a tool reference plane as in claim 1, wherein upon identifying the plurality of the tool reference plane containing sphere regions, the means for identifying the plurality of tool reference plane containing sphere regions:

determines, a plurality of sphere regions that are aligned along a predetermined search direction as a set of process subject sphere regions, identifies at least one of the tool reference plane containing sphere regions from among the set of process subject sphere regions, determines twenty-six sphere regions that circumscribe the identified tool reference plane containing sphere region to be another set of process subject sphere regions, further identifies at least one of the tool reference plane containing sphere regions from among the another set of process subject sphere regions, and further determines twenty-six sphere regions that circumscribe the identified tool reference plane containing sphere region to be yet another set of process subject sphere regions.

5. The apparatus for calculating a tool reference plane as in claim 1, wherein
upon identifying the plurality of the tool reference plane containing sphere regions, the means for identifying the plurality of tool reference plane containing sphere regions:
extracts, a predetermined machining plane containing sphere region from the machining plane containing sphere region data and a nearest point on the machining plane model from the center position of the predetermined machining plane containing sphere region,
calculates a normal vector direction of the machining plane model on the nearest point based on the center point of the extracted machining plane containing sphere region and the nearest point thereto,
determines a plurality of sphere regions that are aligned along the direction of the normal vector as a set of process subject sphere regions,
identifies at least one of the tool reference plane containing sphere regions from among the set of process subject sphere regions,
determines twenty-six sphere regions that circumscribe the identified tool reference plane containing sphere region to be another set of process subject sphere regions,
further identifies at least one tool reference plane containing sphere region from among the another set of process subject sphere regions, and
further determines twenty-six sphere regions that circumscribe the identified tool reference plane containing sphere region to be yet another set of process subject sphere regions.

6. A method for calculating a tool reference plane that is offset from a machining plane model in accordance with a tool shape model, the method comprising the following steps performed by a processor:
storing machining plane model data that describes the machining plane model that is arranged in a first XYZ coordinate system;
storing inversed tool shape data that describes the tool shape model that is inversely arranged in a second XYZ coordinate system, wherein the tool shape model has a tool reference point that is located at the origin of the second XYZ coordinate system;
determining a plurality of sphere regions in the first XYZ coordinate system and the second XYZ coordinate system respectively, wherein center points of the sphere regions are grid points that are arranged three dimensionally with a predetermined grid interval and a radius of each sphere regions is equal to $3^{1/2}/2$ times the predetermined grid interval;
identifying a plurality of machining plane containing sphere regions, in which the machining plane model is contained, from among the plurality of sphere regions in the first XYZ coordinate system;
further identifying, for each machining plane containing sphere region, a nearest point on the machining plane model from the center point of the machining plane containing sphere region;
storing machining plane containing sphere region data describing each of the identified machining plane containing sphere regions in association with the nearest point on the machining plane model identified based on the center point of the machining plane containing sphere region;
identifying a plurality of inversed tool model containing sphere regions, in which the inversed tool model is contained, from among the plurality of sphere regions in the second XYZ coordinate system;
further identifying, for each inversed tool model containing sphere region, a nearest point on the inversed tool model from the center point of the identified inversed tool model containing sphere region;
storing inversed tool model containing sphere region data describing each of the identified inversed tool model containing sphere regions in association with the nearest point on the inversed tool model identified based on the center point of the inversed tool model containing sphere region;
identifying, based on the machining plane containing sphere region data and the inversed tool model containing sphere region data, a plurality of tool reference plane containing sphere regions from among the plurality of sphere regions in the first XYZ coordinate system, wherein a sphere region in the first XYZ coordinate system is identified as a tool reference plane containing sphere region if one or more inversed tool model containing sphere regions make contact with one or more machining plane containing sphere regions when the sphere region has its center point coinciding with the tool reference point of the inversed tool model and the inversed tool model containing sphere regions are arranged inversely in the first XYZ coordinate system;
further identifying one or more contact point containing sphere regions, wherein the one or more machining plane containing sphere regions making contact with the one or more inversed tool model containing sphere regions are identified as the contact point containing sphere regions;
identifying a plurality of offset points, which is a step in which an offset candidate point identifying process is performed for each of the identified contact point containing sphere region to calculate one or more offset candidate points and to identify one of the identified offset candidate points that is contained within the tool reference plane containing sphere region and is closest to the center point of the tool reference plane containing sphere region as an offset point, wherein the offset candidate point identifying process comprises:
retrieving, from the machining plane containing sphere region data, the nearest point on the machining plane model from the center point of the contact point containing sphere region;
calculating a relative coordinate position from the center point of the contact point containing sphere region to the center point of the tool reference plane containing sphere region;
identifying, from the inversed tool model containing sphere region data, one inversed tool model containing sphere region that has a relative position from the tool reference point to its center point equaling to the calculated relative coordinate position;
retrieving, from the inversed tool model containing sphere region data, the nearest point on the inversed tool model from the identified inversed tool model containing sphere regions; and
calculating the offset candidate point by shifting the retrieved nearest point on the machining plane model by an amount equal to the coordinate position of the retrieved nearest point on the inversed tool model; and storing tool reference plane model data that describes coordinate positions of the plurality of identified offset points.

7. A non-transitory storing medium storing a program for creating a tool reference plane that is offset from a machining plane model in accordance with a tool shape model, the program comprising instructions for a processor to perform the following steps:

storing machining plane model data that describes the machining plane model that is arranged in a first XYZ coordinate system;

storing inversed tool shape data that describes the tool shape model that is inversely arranged in a second XYZ coordinate system, wherein the tool shape model has a tool reference point that is located at the origin of the second XYZ coordinate system;

determining a plurality of sphere regions in the first XYZ coordinate system and the second XYZ coordinate system respectively, wherein center points of the sphere regions are grid points that are arranged three dimensionally with a predetermined grid interval and a radius of each sphere regions is equal to $3^{1/2}/2$ times the predetermined grid interval;

identifying a plurality of machining plane containing sphere regions, in which the machining plane model is contained, from among the plurality of sphere regions in the first XYZ coordinate system;

further identifying, for each machining plane containing sphere region, a nearest point on the machining plane model from the center point of the machining plane containing sphere region;

storing machining plane containing sphere region data, each of which describes the identified machining plane containing sphere region in association with the nearest point on the machining plane model identified based on the center point of the machining plane containing sphere region;

identifying a plurality of inversed tool model containing sphere regions, in which the inversed tool model is contained, from among the plurality of sphere regions in the second XYZ coordinate system;

further identifying, for each inversed tool model containing sphere region, a nearest point on the inversed tool model from the center point of the identified inversed tool model containing sphere region;

storing inversed tool model containing sphere region data, each of which describes the identified inversed tool model containing sphere region in association with the nearest point on the inversed tool model identified based on the center point of the inversed tool model containing sphere region;

identifying, based on the machining plane containing sphere region data and the inversed tool model containing sphere region data, a plurality of the tool reference plane containing sphere regions from among the plurality of sphere regions in the first XYZ coordinate system, wherein a sphere region in the first XYZ coordinate system is identified as a tool reference plane containing sphere region if one or more inversed tool model containing sphere regions make contact with one or more machining plane containing sphere regions when the sphere region has its center point coinciding with the tool reference point of the inversed tool model and the inversed tool model containing sphere regions are arranged inversely in the first XYZ coordinate system;

further identifying one or more contact point containing sphere regions, wherein the one or more machining plane containing sphere regions making contact with the one or more inversed tool model containing sphere regions are identified as the contact point containing sphere regions;

identifying a plurality of offset points, which is a step in which an offset candidate point identifying process is performed for each of the identified contact point containing sphere region to calculate one or more offset candidate points and to identify one of the identified offset candidate points that is contained within the tool reference plane containing sphere region and is closest to the center point of the tool reference plane containing sphere region as an offset point, wherein the offset candidate point identifying process comprises:

retrieving, from the machining plane containing sphere region data, the nearest point on the machining plane model from the center point of the contact point containing sphere region;

calculating a relative coordinate position from the center point of the contact point containing sphere region to the center point of the tool reference plane containing sphere region;

identifying, from the inversed tool model containing sphere region data, one inversed tool model containing sphere region that has a relative position from the tool reference point to its center point equaling to the calculated relative coordinate position;

retrieving, from the inversed tool model containing sphere region data, the nearest point on the inversed tool model from the identified inversed tool model containing sphere regions; and calculating the offset candidate point by shifting the retrieved nearest point on the machining plane model by an amount equal to the coordinate position of the retrieved nearest point on the inversed tool model; and storing tool reference plane model data that describes coordinate positions of the plurality of identified offset points.

* * * * *